US008631173B2

(12) United States Patent
Yoshikawa et al.

(10) Patent No.: US 8,631,173 B2
(45) Date of Patent: Jan. 14, 2014

(54) SEMICONDUCTOR DEVICE

(75) Inventors: Takashi Yoshikawa, Kawasaki (JP); Shigehiro Asano, Yokosuka (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 666 days.

(21) Appl. No.: 12/050,899

(22) Filed: Mar. 18, 2008

(65) Prior Publication Data

US 2008/0244240 A1    Oct. 2, 2008

(30) Foreign Application Priority Data

Mar. 28, 2007   (JP) ................................. 2007-084281

(51) Int. Cl.
*G06F 3/00* (2006.01)
*G06F 5/00* (2006.01)

(52) U.S. Cl.
USPC .......... 710/52; 326/56; 365/189.05; 709/234; 711/118

(58) Field of Classification Search
None
See application file for complete search history.

(56) References Cited

U.S. PATENT DOCUMENTS

| 4,136,383 | A | * | 1/1979 | Takesue ........................ 712/221 |
| 5,828,894 | A | * | 10/1998 | Wilkinson et al. ............. 712/20 |
| 6,108,760 | A | * | 8/2000 | Mirsky et al. ................. 711/203 |
| 6,442,585 | B1 | * | 8/2002 | Dean et al. .................... 718/108 |
| 6,550,056 | B1 | * | 4/2003 | Mizumoto et al. ............ 717/124 |
| 6,615,340 | B1 | * | 9/2003 | Wilmot, II .................... 712/209 |
| 6,738,891 | B2 | | 5/2004 | Fuji et al. ....................... 712/16 |
| 7,348,798 | B2 | * | 3/2008 | Marui ............................. 326/41 |
| 7,490,230 | B2 | * | 2/2009 | Jensen et al. .................. 712/245 |
| 2001/0010074 | A1 | * | 7/2001 | Nishihara et al. ............ 712/227 |
| 2001/0021972 | A1 | * | 9/2001 | Topham ........................ 712/217 |
| 2002/0056037 | A1 | * | 5/2002 | Wolrich et al. ............... 712/215 |
| 2004/0103264 | A1 | * | 5/2004 | Fujii et al. ........................ 712/15 |
| 2004/0153630 | A1 | * | 8/2004 | Henry et al. .................. 712/209 |

(Continued)

FOREIGN PATENT DOCUMENTS

| JP | 62-46354 | 2/1987 |
| JP | 2006-18514 | 1/2006 |
| JP | 2006-40254 | 2/2006 |
| JP | 2006-99719 | 4/2006 |

OTHER PUBLICATIONS

Search report from corresponding JP 2007-084281 dated Nov. 25, 2008.
Sumiyoshi, et al., "*Reconfigurable System*", 2005, pp. 141-208.

(Continued)

*Primary Examiner* — Henry Tsai
*Assistant Examiner* — Christopher Bartels
(74) *Attorney, Agent, or Firm* — Ohlandt, Greeley, Ruggiero & Perle, L.L.P.

(57) ABSTRACT

A semiconductor device includes a first arithmetic engine which executes a first arithmetic process in every cycle and outputs first data representing the result of the first arithmetic process and a first valid signal representing a first or second value in every cycle, and a second arithmetic engine which executes a second arithmetic process in every cycle and outputs second data representing the result of the second arithmetic process and a second valid signal representing the first or second value in every cycle. The device also includes an inter-arithmetic-engine buffer which is used to exchange the first data and the second data between the first and second arithmetic engines, enables write of the first or second data if the first or second valid signal indicates the first value, and inhibits write of the first or second data if the first or second valid signal indicates the second value.

18 Claims, 17 Drawing Sheets

(56) References Cited

U.S. PATENT DOCUMENTS

| | | | |
|---|---|---|---|
| 2005/0044319 A1* | 2/2005 | Olukotun | 711/118 |
| 2005/0216702 A1* | 9/2005 | Paolucci et al. | 712/35 |
| 2007/0030278 A1* | 2/2007 | Prokopenko et al. | 345/506 |
| 2007/0074010 A1* | 3/2007 | Nakajima | 712/226 |
| 2007/0198792 A1* | 8/2007 | Dice et al. | 711/163 |
| 2008/0276220 A1* | 11/2008 | Munshi et al. | 717/119 |

OTHER PUBLICATIONS

Tomoyoshi Sato, "*DAPDNA-2: A dynamically reconfigurrable Processor with 376 32-bit processing elements*", HotChips17, Aug. 16, 2005, pp. 1-24.

Search report (with English translation) from corresponding JP 2009-014308 dated Oct. 12, 2010.

\* cited by examiner

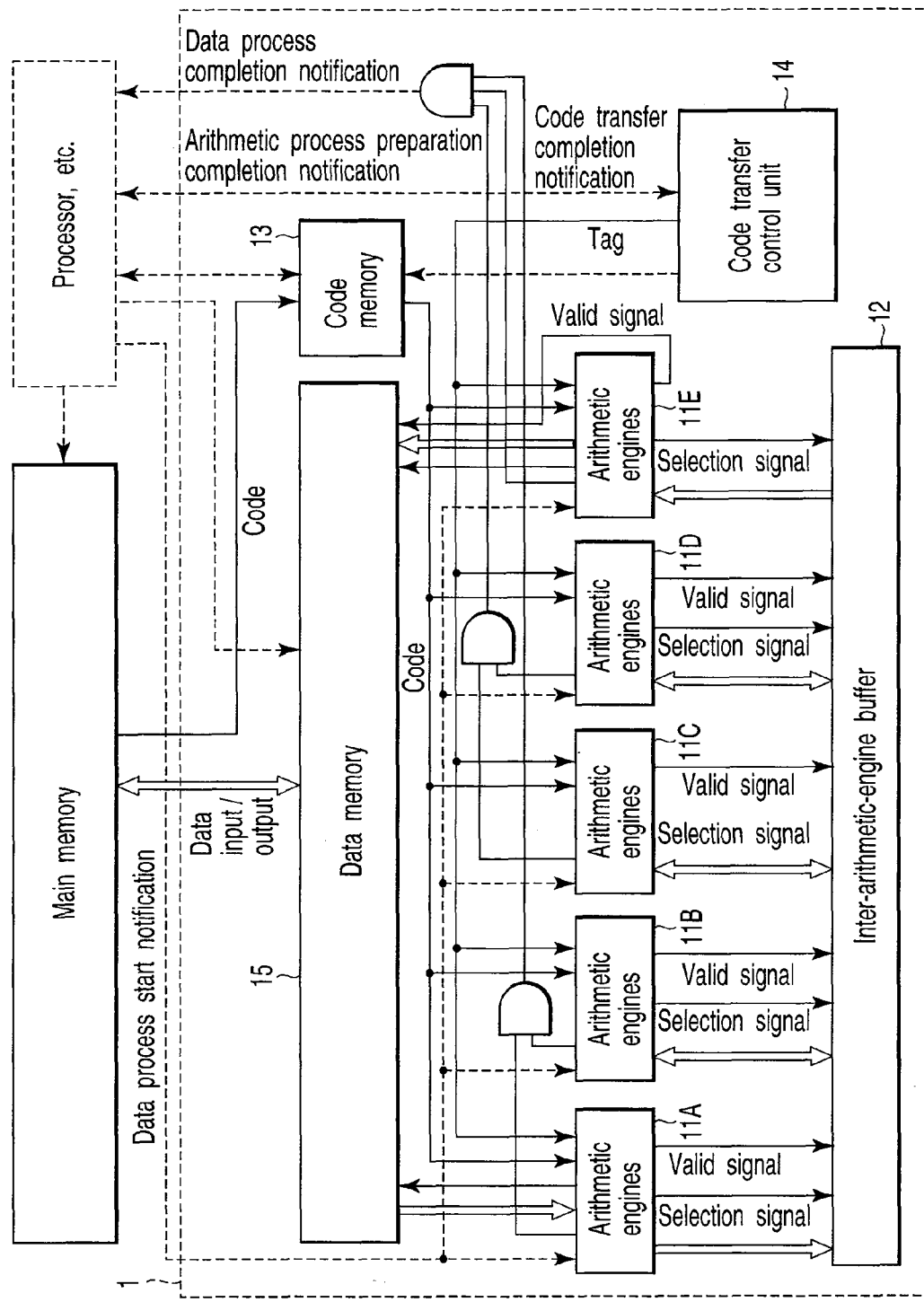
F I G. 1

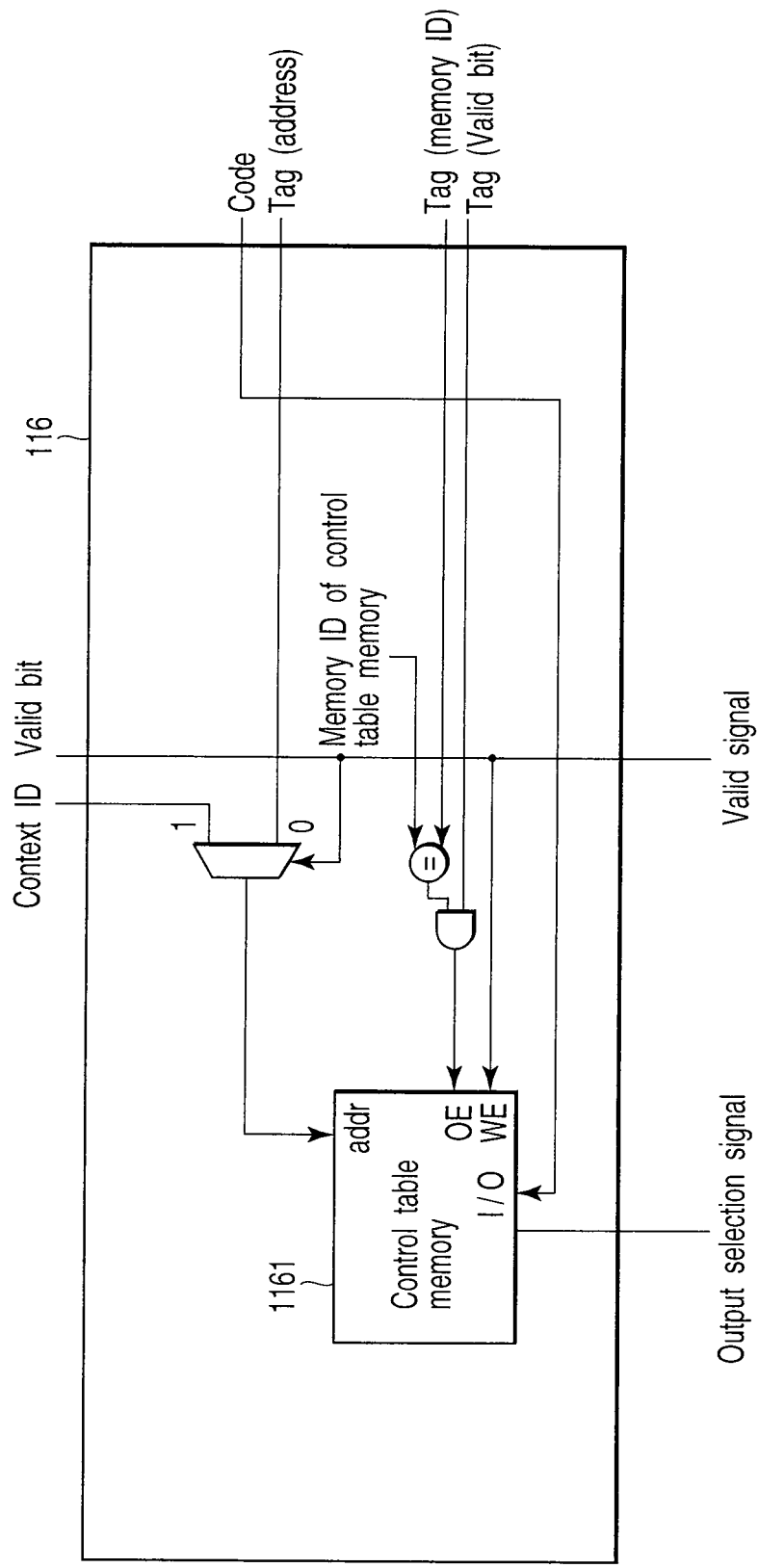
F I G. 10

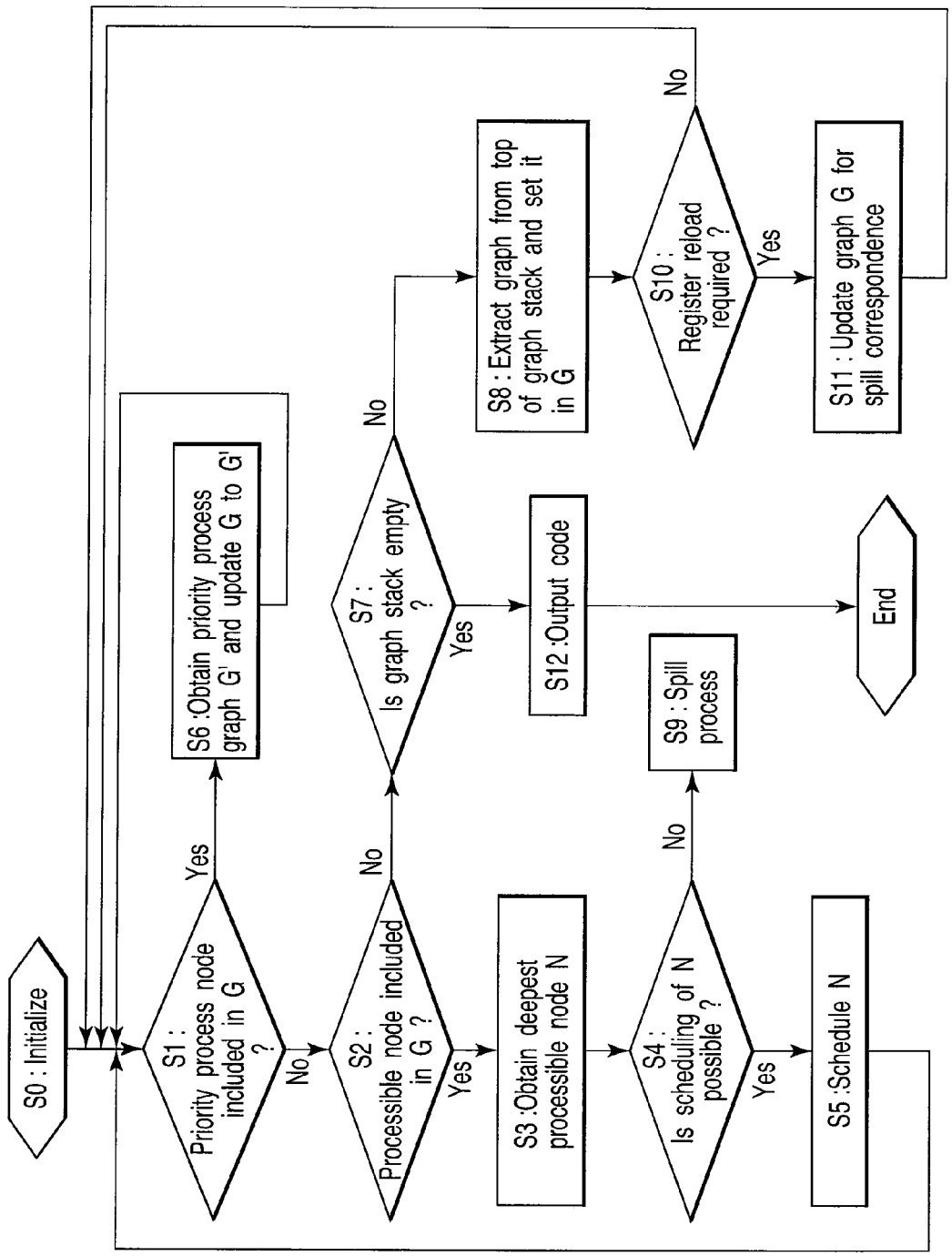
F I G. 12

SEMICONDUCTOR DEVICE

CROSS-REFERENCE TO RELATED APPLICATIONS

This application is based upon and claims the benefit of priority from prior Japanese Patent Application No. 2007-084281, filed Mar. 28, 2007, the entire contents of which are incorporated herein by reference.

BACKGROUND OF THE INVENTION

1. Field of the Invention

The present invention relates to a semiconductor device using a dynamically reconfigurable circuit technology.

2. Description of the Related Art

Recently, portable devices that are required to be inexpensive and power-thrifty are also diversifying and supporting more complex functions, and therefore demand higher performance. To simultaneously attain high performance and low power consumption, development of dedicated hardware is inevitable, and the cost of development and manufacturing is growing every year. From this viewpoint, a semiconductor device using a dynamically reconfigurable circuit technology has received a great deal of attention (e.g., "Reconfigurable System", Ohmsha, pp. 141-208).

A semiconductor device using a dynamically reconfigurable circuit technology is the same as a normal processor which executes an arithmetic process in accordance with instructions given by software but is different in the following points. The semiconductor device using the dynamically reconfigurable circuit technology can read out, from a storage device, a setting of an arithmetic device corresponding to an instruction and change it at the time of operation. The contents of the storage device are dynamically rewritable. The semiconductor device can execute a variety of arithmetic processes in accordance with one instruction by dynamically rewriting a corresponding arithmetic device setting stored in the storage device as needed on the basis of the usage situation. That is, the semiconductor device is different from a normal processor in that the correspondence between instructions and the settings of arithmetic devices is dynamically changeable.

In a normal processor incapable of dynamically changing the settings of arithmetic devices corresponding to instructions, the settings of an arithmetic device are encoded to associate different settings with different instructions. The coded settings are called "instructions". If the number of kinds of settings that can be implemented by an arithmetic device is increased to improve the performance, the bit width of an instruction increases, and the size of the storage device such as a memory necessary for storing the instructions also increases. This increases the manufacturing cost and power consumption in decoding a coded arithmetic device setting from an instruction.

On the other hand, the semiconductor device using the dynamically reconfigurable circuit technology can dynamically change the correspondence between instructions and the settings of arithmetic devices. The bit width of an instruction necessary for changing a setting of an arithmetic device increases less even when the number of kinds of settings that can be implemented by the arithmetic device increases.

Hence, from the viewpoint of manufacturing cost and power consumption, the semiconductor device using the dynamically reconfigurable circuit technology is assumed as more advantageous than a semiconductor device such as a normal processor with an equivalent processing function.

To further improve the performance of the semiconductor device using the dynamically reconfigurable circuit technology, it is necessary to provide a plurality of arithmetic devices in the semiconductor device and independently control setting change of the arithmetic devices. It is also necessary to enable the transfer of calculated data between the arithmetic devices and a change in settings for data transfer.

Assume such a semiconductor device which executes one arithmetic process by using a plurality of arithmetic devices is like an assembly line. When an arithmetic device is going to transfer the arithmetic result to another arithmetic device, the arithmetic device which should receive the arithmetic result may not be ready for reception. In this case, the arithmetic device which is going to transfer the arithmetic result must stop the process. In addition, all arithmetic devices in the assembly line, which are located before the arithmetic device to be stopped, must also stop the process. This stop process is called a pipeline interlock process.

The conventional semiconductor device using the dynamically reconfigurable circuit technology implements no pipeline interlock mechanism. Instead, the number of arithmetic devices or the number of buffers to be used for data transfer between arithmetic devices is increased to minimize the situations that require the pipeline interlock process even in a complex arithmetic process. A more complex arithmetic process which would inevitably cause a pipeline interlock process is divided into a plurality of arithmetic processes and sequentially executed.

Without the pipeline interlock mechanism, the conventional semiconductor device using the dynamically reconfigurable circuit technology has a problem of high manufacturing cost because of the many arithmetic devices or many buffers necessary for avoiding the pipeline interlock process.

Additionally, if a complex arithmetic process is divided into a plurality of arithmetic processes and sequentially executed to avoid the pipeline interlock process, the arithmetic process becomes inefficient.

To change a complex arithmetic process to a process that requires no pipeline interlock process, arithmetic devices to transfer/receive data may execute a wasteful process irrelevant to the arithmetic process, thereby altering the data transfer/reception timing. However, this method needs extra power consumption for the wasteful arithmetic process and is therefore not adopted by the semiconductor device using the dynamically reconfigurable circuit technology, which is mounted in a device required to be power-thrifty.

BRIEF SUMMARY OF THE INVENTION

According to an aspect of the present invention, there is provided a semiconductor device comprising a first arithmetic engine which executes a first arithmetic process in every cycle and outputs first data representing a result of the first arithmetic process and a first valid signal representing one of a first value and a second value in every cycle, a second arithmetic engine which executes a second arithmetic process in every cycle and outputs second data representing a result of the second arithmetic process and a second valid signal representing one of the first value and the second value in every cycle, and an inter-arithmetic-engine buffer which is used to exchange the first data and the second data between the first arithmetic engine and the second arithmetic engine, enables write of one of the first data and the second data if one of the first valid signal and the second valid signal indicates the first value, and inhibits write of one of the first data and the second data if one of the first valid signal and the second valid signal indicates the second value.

BRIEF DESCRIPTION OF THE SEVERAL VIEWS OF THE DRAWING

FIG. 1 is a block diagram showing a semiconductor device according to an embodiment;

FIG. 10 is a circuit diagram showing another output controller;

FIG. 12 is a flowchart illustrating a code generation procedure;

DETAILED DESCRIPTION OF THE INVENTION

Figure 2:
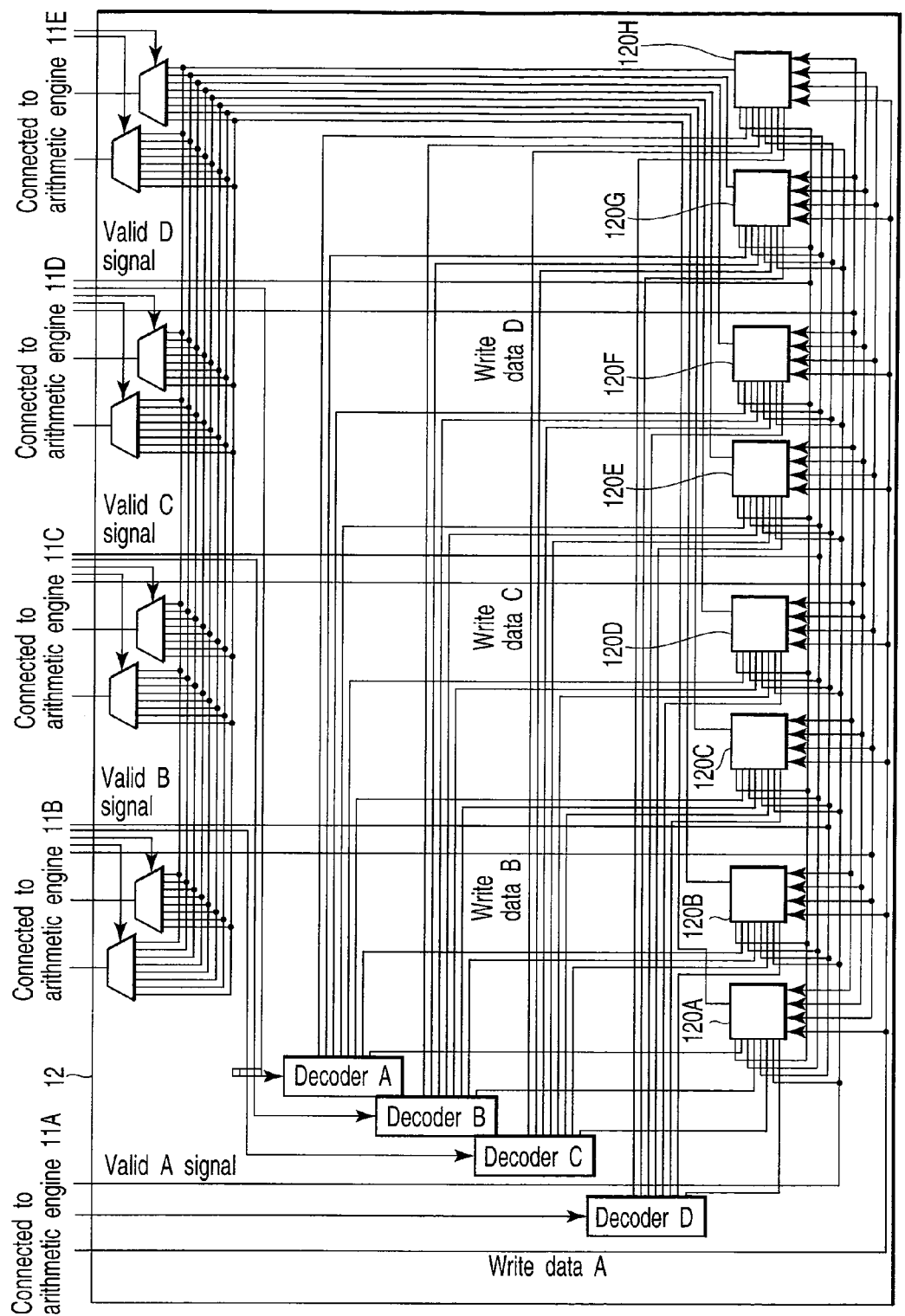
FIG. 2 is a circuit diagram showing an inter-arithmetic-engine buffer.

Referring to FIG. 1, a semiconductor device 1 is a dynamically reconfigurable device which executes a data process in accordance with a designation from an external device such as a processor. The semiconductor device 1 includes five arithmetic engines 11A to 11E, an inter-arithmetic-engine buffer 12, a code memory 13, a code transfer control unit 14, and a data memory 15. "Data process" is a general term for a series of arithmetic processes individually executed by the arithmetic engines 11A to 11E.

The code memory 13 is connected to the arithmetic engines 11A to 11E and code transfer control unit 14. The data memory 15 is connected to the input of the arithmetic engine 11A and the output of the arithmetic engine 11E. The inter-arithmetic-engine buffer 12 is connected to the inputs of the arithmetic engines 11B to 11E and the outputs of the arithmetic engines 11A to 11D.

The arithmetic engines 11A to 11E can dynamically change the settings of arithmetic processes. The arithmetic engines 11A to 11E execute arithmetic processes for data input to them while changing the settings in accordance with a code transferred from the code memory 13 before the start of the data process. The arithmetic engines 11A to 11E output data representing the arithmetic results to the inter-arithmetic-engine buffer 12 together with a Valid signal.

Referring to FIG. 2, the inter-arithmetic-engine buffer 12 having eight data registers 120A to 120H is used for data transfer/reception between the arithmetic engines. Each of the arithmetic engines 11A to 11E selects one of the data registers 120A to 120H in accordance with a code and uses it for read and write. No write to the inter-arithmetic-engine buffer 12 is done when the Valid signal from the arithmetic engines 11A to 11D is 0.

The code memory 13 stores codes to be used by the arithmetic engines 11A to 11E. A processor or the like transfers codes from the main memory to the code memory 13 in advance before the semiconductor device 1 starts a data process.

The code transfer control unit 14 has a function of sequentially reading out the codes from the code memory 13 and transferring them to the arithmetic engines 11A to 11E upon receiving a code transfer completion notification from, e.g., the processor.

The data memory 15 temporarily stores data the semiconductor device 1 gives at the start of a data process or an intermediate result or final result of the data process performed by the semiconductor device 1. An external device such as a processor writes initial input data in the data memory 15 before the start of a data process. The semiconductor device 1 can also continue a data process by inputting again an intermediate result of the data process held in the data memory 15. An external device such as a processor reads out the final result held in the data memory 15 and writes it in the main memory.

In this embodiment, the semiconductor device 1 has five arithmetic engines 11A to 11E and eight data registers 120A to 120H. However, the number of arithmetic engines or the number of data registers may be changed in accordance with the process capability required of the semiconductor device 1.

Figure 3:
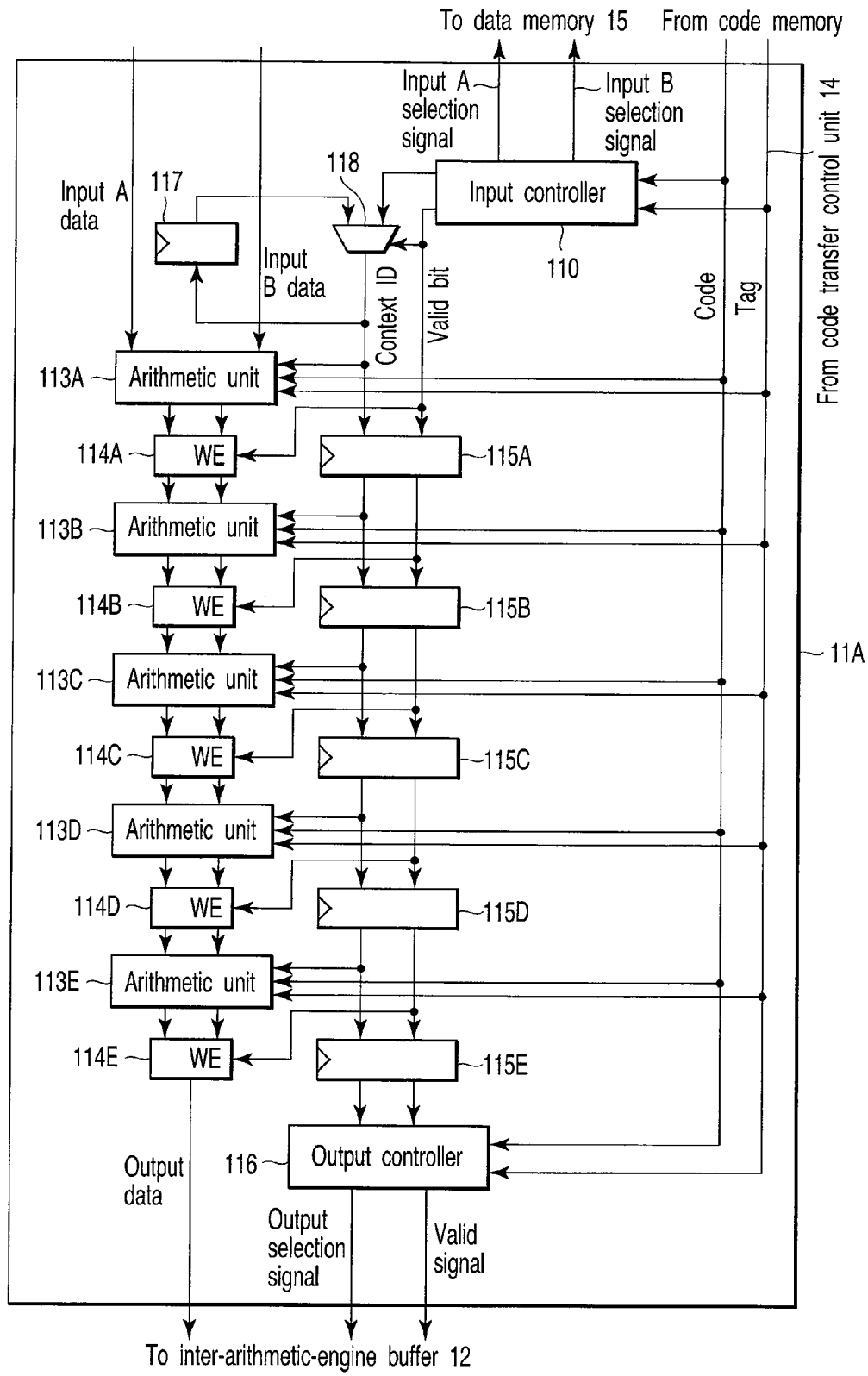
FIG. 3 is a circuit diagram showing an arithmetic engine.

Referring to FIG. 3 the arithmetic engine 11A includes an input controller 110, arithmetic units 113A to 113E, data pipeline registers 114A to 114E, control pipeline registers 115A to 115E, an output controller 116, a final context ID latch 117, and a multiplexer 118.

The input controller 110, arithmetic units 113A to 113E, and output controller 116 are connected to the code memory 13 and code transfer control unit 14. Codes to be sent from the code memory 13 to the arithmetic engines 11A to 11E are stored in the internal storage units of the input controller 110, arithmetic units 113A to 113E, and output controller 116 while being divided into parts to be used in the respective units in accordance with the values of tags sent from the code transfer control unit 14 simultaneously.

The input controller 110 is also connected to the data memory 15. The input controller 110 sequentially interprets the codes stored in the internal storage unit, outputs an input A selection signal and input B selection signal representing an input data reference position, and reads out data from the data memory 15.

The input controller 110 is also connected to the control pipeline register 115A and multiplexer 118 and outputs a context ID and a Valid bit to them, respectively, by sequentially interpreting the same codes. If the Valid bit is 1, the multiplexer 118 selects the value of the context ID output from the input controller 110. If the Valid bit is 0, the multiplexer 118 selects a value to be set in the final context ID latch 117. This value is set in the control pipeline register 115A together with the Valid bit. The value selected by the multiplexer 118 is also set in the final context ID latch 117. The final context ID latch 117 is set to 0 at the start of a data process.

The control pipeline registers 115A to 115D are connected to the control pipeline registers 115B to 115E, respectively, and the control pipeline register 115E is connected to the output controller 116, thereby forming a pipeline for controlling the operations of the arithmetic units 113A to 113E. The values of a context ID and Valid bit set in the control pipeline register 115A by the input controller 110 in a given cycle are sequentially transferred to the control pipeline registers 115B to 115E and then to the output controller 116 in every cycle from then on. This transfer is called pipeline transfer.

The arithmetic units 113A to 113E are connected to the control pipeline registers 115A to 115E, respectively. The outputs of the arithmetic units 113A to 113D are connected to the inputs of the arithmetic units 113B to 113E via the data pipeline registers 114A to 114D, respectively, thereby forming a data pipeline for calculating data. Note that the input of the arithmetic unit 113A is connected to the data memory 15. The output of the arithmetic unit 113E is connected to the inter-arithmetic-engine buffer 12 via the data pipeline register 114E.

The arithmetic units 113A to 113E can change the settings of arithmetic processes. In each cycle, the arithmetic units 113A to 113E read out a code from the internal storage units by using, as an address, the context ID set in the control pipeline registers 115A to 115E and change the settings of arithmetic processes in accordance with a piece of setting information selected based on the code. The arithmetic units 113A to 113E execute arithmetic processes for data set in the input A data signal and input B data signal in that cycle in accordance with the changed settings and write the arithmetic results in the data pipeline registers 114A to 114E. No arithmetic results are written in the data pipeline registers 114A to 114E when the Valid bit set in the control pipeline registers 115A to 115E is 0.

That is, in the arithmetic engine 11, when the Valid bit output from the input controller 110 is 0, setting information represented by the context ID stored in the final context ID latch 117 is used as the settings of the arithmetic unit 113. For this reason, the settings of the arithmetic unit 113 do not change while the Valid bit is 0. The value of the data pipeline register 114 does not change, either, while the Valid bit is 0. Hence, the output result from the arithmetic unit 113 does not change, either, because it executes an arithmetic process by using the value of the data pipeline register 114 as the input. The semiconductor device 1 reduces changes in signal lines caused when the Valid bit is 0, thereby reducing the power consumed by the arithmetic unit 113 and data pipeline register 114 as compared to a conventional dynamically reconfigurable circuit that uses no pipeline interlock.

The output controller 116 is connected to the inter-arithmetic-engine buffer 12. The output controller 116 reads out a code from the internal storage unit by using, as an address, a context ID output from the control pipeline register 115E and outputs an output selection signal representing a data output position in accordance with the code. The output controller 116 also outputs, as a Valid signal, the Valid bit set in the control pipeline register 115E.

The connection relationship between the arithmetic engines 11B to 11E and the remaining devices included in the semiconductor device 1 is different from that of the arithmetic engine 11A, though the internal arrangement is the same as that of the arithmetic engine 11A. The input controller 110 and arithmetic unit 113A included in each of the arithmetic engines 11B to 11E are connected to the inter-arithmetic-engine buffer 12. The output controller 116 and data pipeline register 114E included in the arithmetic engine 11E are connected to the data memory 15.

Each of the arithmetic engines 11A to 11E has five arithmetic units 113. However, the number of arithmetic units may be changed in accordance with the process capability required of the semiconductor device 1. The number of arithmetic units 113 may change between the arithmetic engines 11A to 11E.

The process flow from the start to the end in the semiconductor device 1 will be described next. The process of the semiconductor device 1 can roughly be divided into a data process and an initialization process before it.

The initialization process will be described first.

An external device such as a processor stores input data to the semiconductor device 1 in the data memory 15 and codes to define the operations of the arithmetic engines 11A to 11E in the code memory 13.

When code storage in the code memory 13 finishes, the external device such as a processor notifies the semiconductor device 1 of the completion of code transfer by a pulse signal. Upon receiving a code transfer completion notification from the semiconductor device 1, the code transfer control unit 14 sequentially reads out the codes from the code memory 13 and transfers them to the arithmetic engines 11A to 11E together with tags representing the storage locations.

The code transferred to each of the arithmetic engines 11A to 11E is stored in the internal storage units of the input controller 110, arithmetic units 113A to 113E, and output controller 116 while being divided into parts to be used in the respective units.

When code transfer to the arithmetic engines 11A to 11E finishes, the code transfer control unit 14 notifies the external device such as a processor of the completion of preparation for an arithmetic process.

When notified of the completion of preparation for an arithmetic process, the external device such as a processor notifies the semiconductor device 1 of the start of the data process by a pulse signal.

The data process will be described next.

The input controller 110 interprets a code stored in the internal storage unit in every cycle and outputs a context ID and Valid bit in every cycle in accordance with the code. One of the context ID output from the input controller 110 in accordance with the Valid bit and a context ID stored in the final context ID latch 117 is selected and pipeline-transferred to the arithmetic units 113A to 113E and output controller 116 together with the Valid bit, as described above. The input controller 110 outputs the input A selection signal and input B selection signal in every cycle in accordance with the code.

The data memory 15 and inter-arithmetic-engine buffer 12 read out data in accordance with the input A selection signal and input B selection signal output from the input controller 110 of each of the arithmetic engines 11A to 11E in every cycle and set the data in the input A data signal and input B data signal of the arithmetic unit 113A of a corresponding one of the arithmetic engines 11A to 11E.

Each of the arithmetic units 113A to 113E reads out the code from the internal storage unit by using the context ID as an address in every cycle and changes the settings of the arithmetic process in accordance with a piece of setting information selected based on the code. Each arithmetic unit executes the arithmetic process for the data set in the input A selection signal and input B selection signal in that cycle in accordance with the changed settings. The arithmetic result is pipeline-transferred to the data memory 15 or inter-arithmetic-engine buffer 12 via the data pipeline registers 114A to 114E. However, the arithmetic result is not written in the data pipeline registers 114A to 114E when the Valid bit is 0.

The output controller 116 reads out a code from the internal storage unit by using the context ID as an address in every cycle and outputs an output selection signal representing a data output position in accordance with the code. The output controller 116 also outputs, as a Valid signal, the Valid bit set in the control pipeline register 115E.

The data memory 15 and inter-arithmetic-engine buffer 12 write the value set in the data pipeline register 114E at the position represented by the output selection signal in every cycle. This write is done only when the Valid signal is 1 and not when the Valid signal is 0.

When the input controller 110 of each of the arithmetic engines 11A to 11E has interpreted all codes, the semiconductor device 1 notifies the external device such as a processor of the completion of the data process. The data process is thus ended.

After a predetermined number of cycles or more are elapsed from reception of the data process completion notification, the external device such as a processor reads out the arithmetic result of the semiconductor device 1 stored in the data memory 15. The predetermined cycle count equals the sum of the number of arithmetic units 113 included in the arithmetic engine 11 which has finally finished code interpretation and the number of cycles necessary for the data write in the data memory 15.

The data register 120, code transfer control unit 14, arithmetic unit 113, output controller 116, and input controller 110 which implement the above-described data process in the semiconductor device 1 will be described next in detail.

Figure 4:
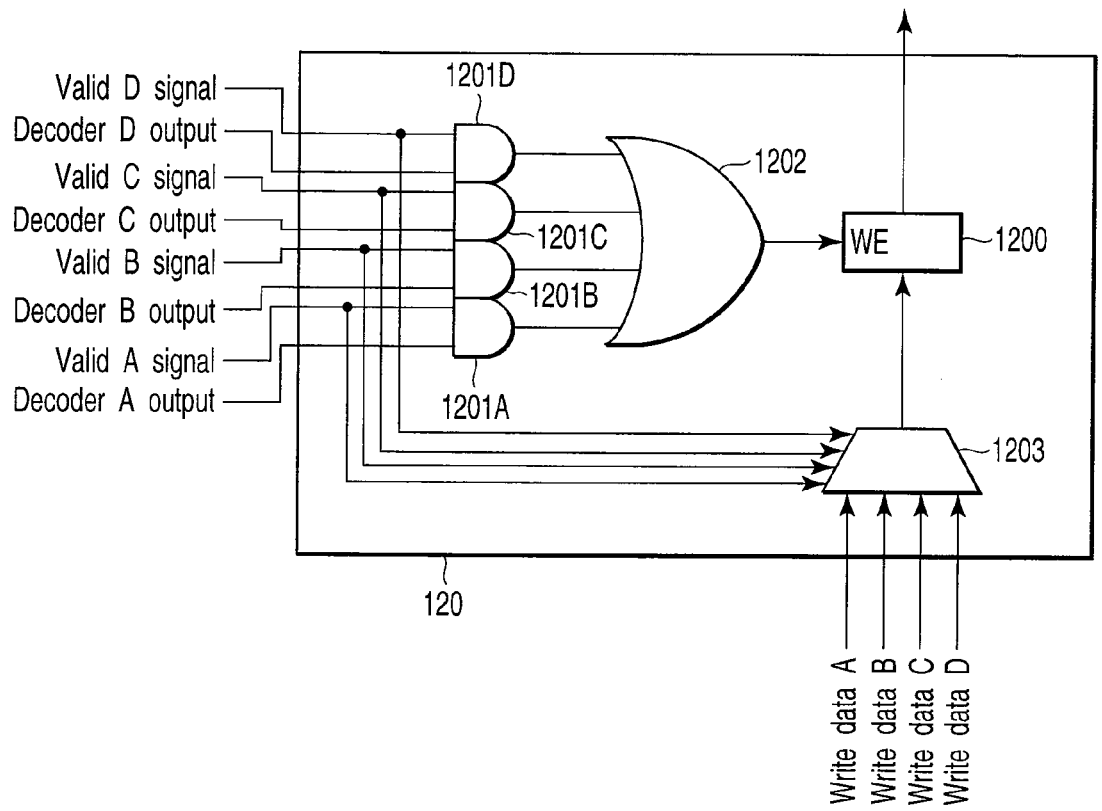
FIG. 4 is a circuit diagram showing a data register in the inter-arithmetic-engine buffer.

FIG. 4 shows an implementation example of the data register 120. The data register 120 includes a data latch 1200, AND logics 1201A to 1201D, an OR logic 1202, and a multiplexer 1203. The data latch 1200 stores data.

Each of the AND logics 1201A to 1201D inputs, to the OR logic 1202, the AND of a corresponding one of decoder A to D outputs and a corresponding one of Valid A to D signals. The OR logic 1202 outputs 1 only when the Valid signal from at least one of the arithmetic engines 11A to 11D is 1, and the output selection signal from the arithmetic engine selects the data register 120 (i.e., when the decoder output from the arithmetic engine is 1). Otherwise, the OR logic 1202 outputs 0. The output signal from the OR logic 1202 is used as a write enable signal for the data latch 1200. For this reason, if the Valid signal is 0, no data is written in the data register 120.

When at least one of the Valid A to D signals are 1, the multiplexer 1203 selects write data A to D from the arithmetic engines 11A to 11D. For example, when the Valid A signal is 1, the multiplexer 1203 selects the write data A from the arithmetic engine 11A. When the Valid B signal is 1, the multiplexer 1203 selects the write data B from the arithmetic engine 11B. This also applies to the Valid C and D signals. The data selected by the multiplexer 1203 is written in the data latch 1200. The output from the multiplexer 1203 when all the Valid A to D signals are 0, or at least two of the Valid A to D signals are 1 is undefined. When all the Valid A to D signals are 0, no data is written in the data latch 1200, as described above.

Figure 5:
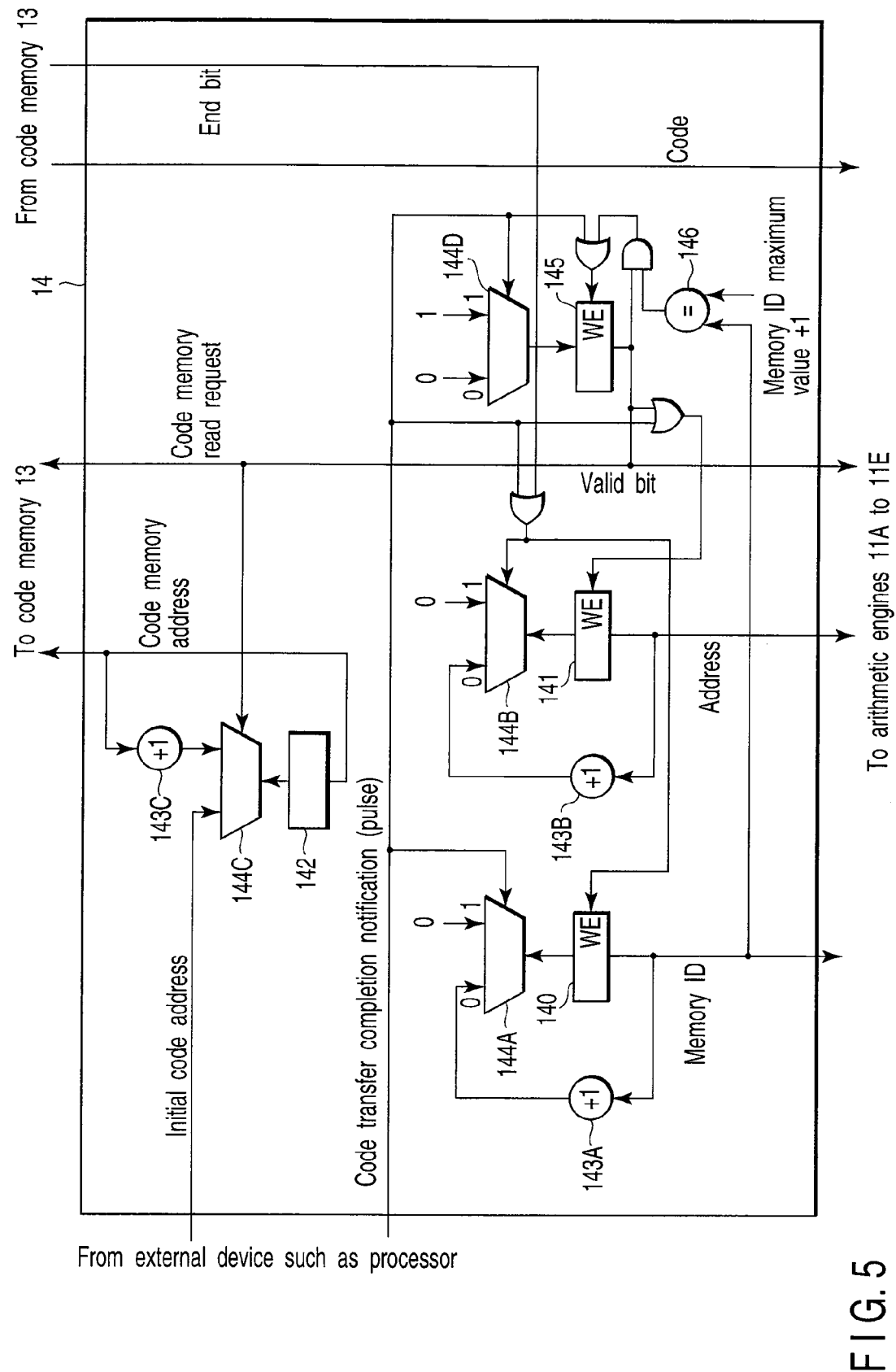
FIG. 5 is a circuit diagram showing a code transfer control unit.

FIG. 5 shows an implementation example of the code transfer control unit 14. The code transfer control unit 14 includes a memory ID register 140, an address register 141, a code address register 142, incrementers 143A to 143C, multiplexers 144A to 144D, a Valid latch 145, and a comparator 146.

Figure 6:
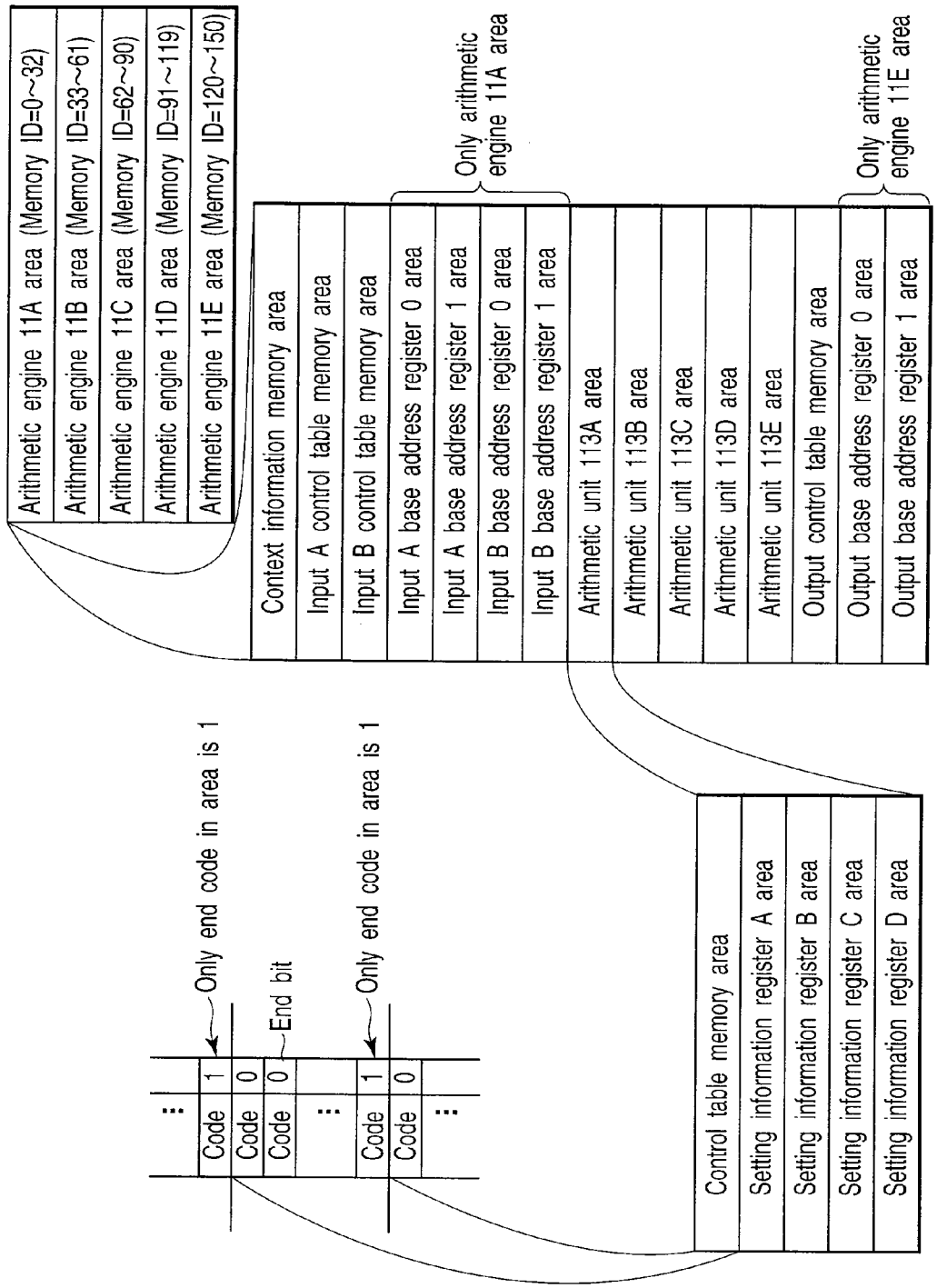
FIG. 6 is a view showing a code arrangement in a code memory.

As shown in FIG. 6, codes are continuously arranged in correspondence with the type of each of code storage memories incorporated in the arithmetic engines 11A to 11E. Each code is added an End bit. The value of an End bit is 1 only when it is added to the last one of continuous codes corresponding to a memory type and 0 when it is added to the other code.

Each code transferred from the code memory 13 to the arithmetic engines 11A to 11E has a memory ID representing the type of the memory storing the code, an address representing the storage location in the memory, and a Valid bit representing whether the code is valid, which are added by the code transfer control unit 14. The values of the memory ID, address, and Valid bit are stored in the memory ID register 140, address register 141, and Valid latch 145, respectively. The set of the memory ID, address, and Valid bit is called the tag of the code.

The code address register 142 stores addresses to be used to read out codes from the code memory 13.

An external device such as a processor writes in advance, in the code address register 142 via an external bus, the start address of the code memory 13 where a code necessary for a data process is stored before notifying the semiconductor device 1 of the completion of code transfer.

When the semiconductor device 1 receives the code transfer completion notification, the multiplexers 144A and 144B select an initial value 0 and store it in the memory ID register 140 and address register 141. In addition, the multiplexer 144D selects a value 1 and sets it in the Valid latch 145.

From the next cycle, the values in the memory ID register 140, address register 141, and Valid latch 145 are added to the code sent from the code memory 13 and transferred to the arithmetic engines 11A to 11E. At the end of the cycle, the incrementers 143B and 143C increment the values in the address register 141 and code address register 142 by one.

When a code having an End bit "1" is transferred from the code memory 13, the incrementer 143A increments the value of the memory ID register 140 by one at the end of the cycle. Additionally, the multiplexer 144B selects 0 and resets the value of the address register 141 to 0.

The above-described process is repeated until the value of the memory ID register 140 reaches a maximum value of valid memory ID+1. When the value of the memory ID reaches the maximum value of valid memory ID+1, 0 is set in the Valid latch 145. Code transfer to the arithmetic engines 11A to 11E is thus ended.

Figure 7:
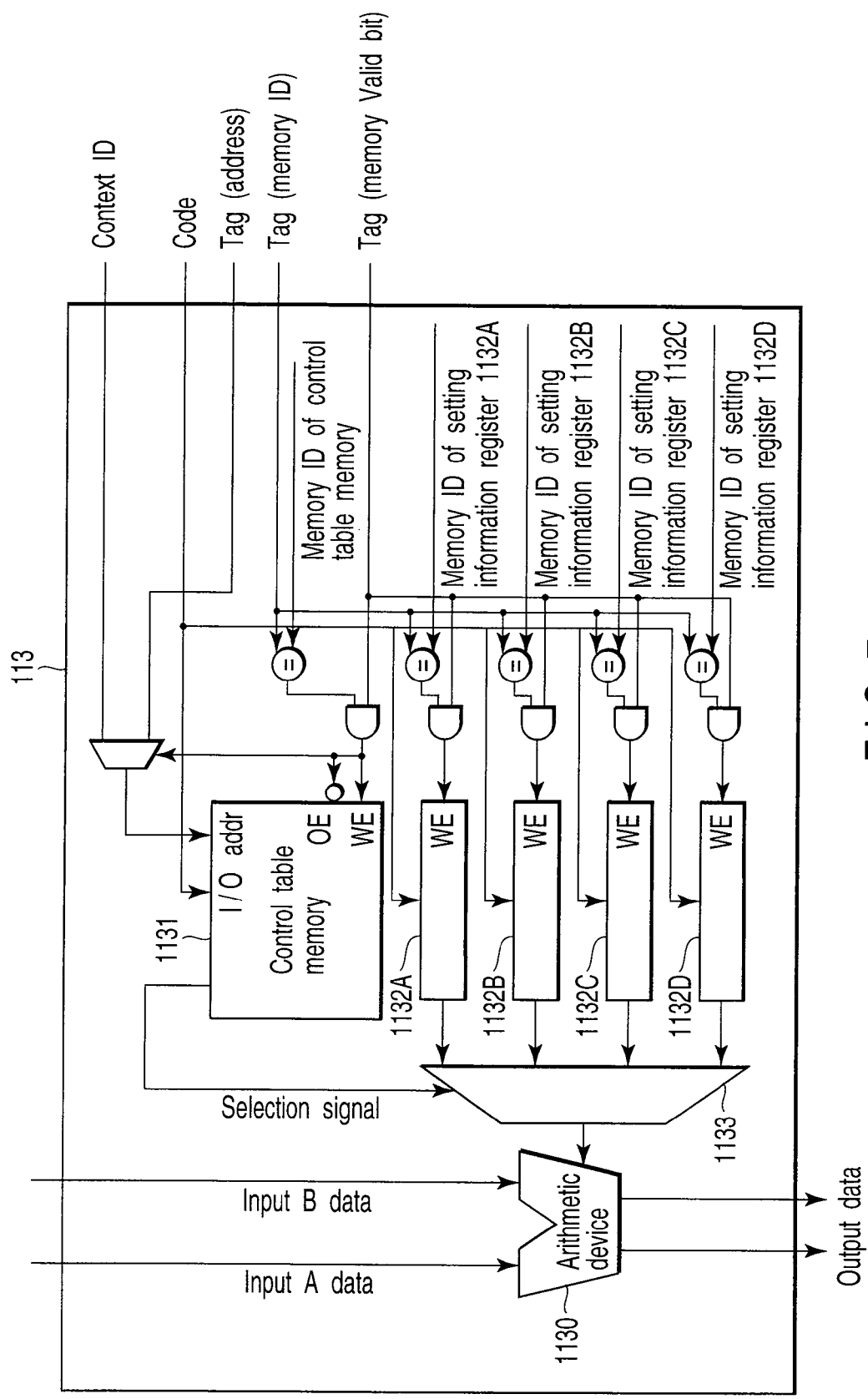
FIG. 7 is a circuit diagram showing an arithmetic unit.

FIG. 7 shows an implementation example of the arithmetic unit 113. The arithmetic unit 113 includes an arithmetic device 1130 capable of dynamically changing settings, a control table memory 1131, setting information registers 1132A to 1132D, and a multiplexer 1133.

The setting information registers 1132A to 1132D store setting information to be used by the arithmetic device 1130 for a data process. The number of setting information registers 1132 can be changed in accordance with the application purpose. The control table memory 1131 stores, sequentially from the start, the selection signal values of the setting information registers 1132A to 1132D in correspondence with the number of types of context IDs to be used in the data process.

The setting information registers 1132A to 1132D and control table memory 1131 are updated in initialization by the code transferred from the code memory 13. When the Valid bit added to the code by the code transfer control unit 14 is 1, and the memory ID added to the code coincides with a memory ID indicating one of the setting information registers 1132A to 1132D or control table memory 1131, the code is written in the control table memory 1131 or one of the setting information registers 1132A to 1132D having the coincident memory ID. To write the code in the control table memory 1131, an address added to the code by the code transfer control unit 14 is used as a write address.

Figure 8:
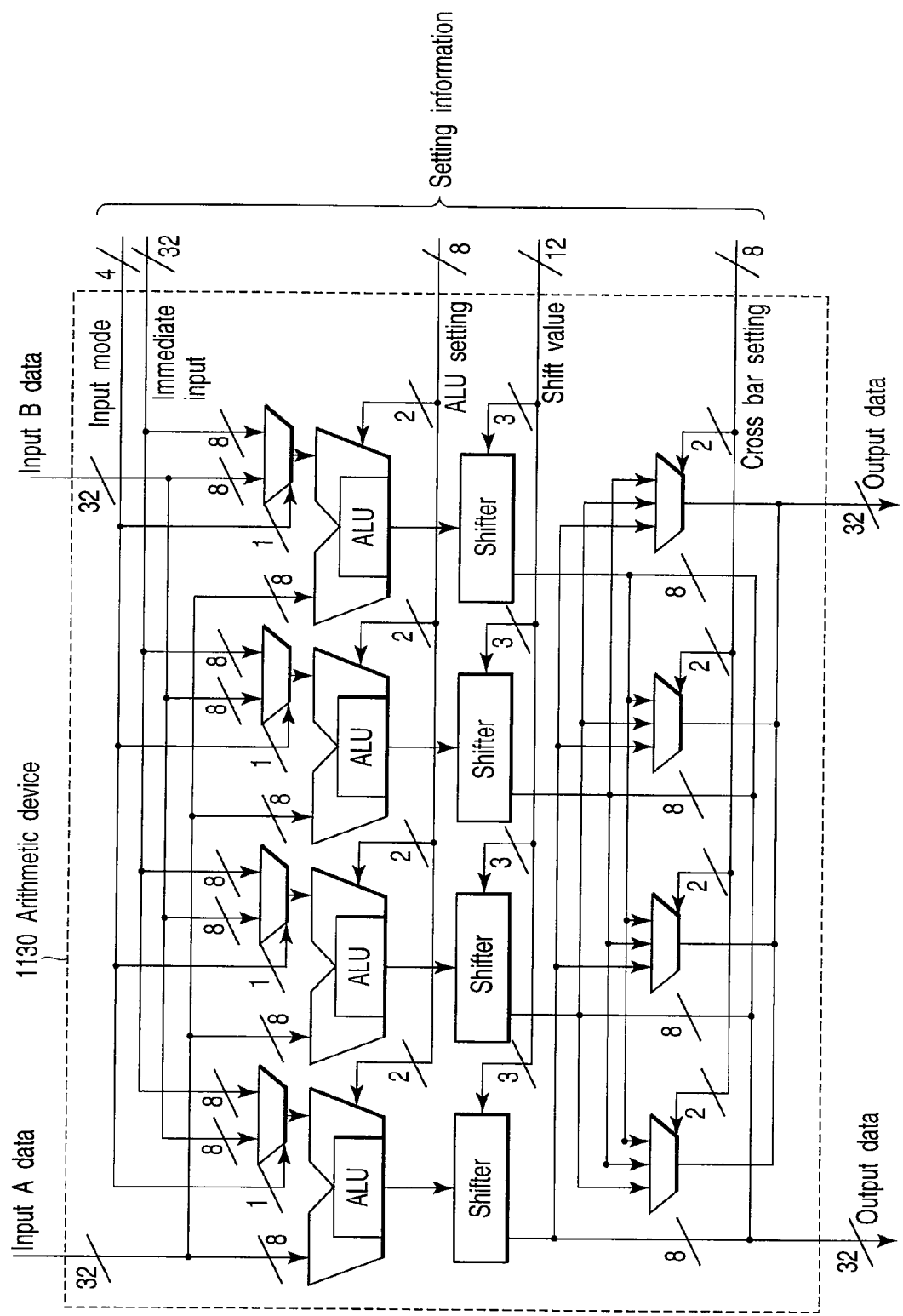
FIG. 8 is a circuit diagram showing an arithmetic device in the arithmetic unit.

FIG. 8 shows an implementation example of the arithmetic device 1130. The arithmetic device 1130 includes four 8-bit ALUs and four shifters. The arithmetic device 1130 can be set to receive two 32-bit inputs and execute different arithmetic processes for every 8 bits. As described above, the settings of the arithmetic device 1130 can be changed dynamically. The arithmetic result of the arithmetic device 1130 corresponds to one of the 32-bit outputs. The arithmetic device 1130 also has cross bars. A result obtained by changing the arrangement order of four 8-bit outputs from the shifters corresponds to the one of the 32-bit outputs.

In this example, the arithmetic device 1130 has setting information of a total of 16 bits per 8-bit arithmetic process: 1 bit representing the input mode to determine whether to set one of the inputs to the ALUs as an immediate value, 8 bits representing an immediate value, 2 bits representing ALU settings, 3 bits representing a shift value, and 2 bits representing cross bar settings. The entire arithmetic device 1130 has 64-bit setting information.

The arithmetic device 1130 reads out a value from the control table memory 1131 by using a context ID sent from the input controller 110 as an address, selects one of the setting information registers 1132A to 1132D by using the readout value as the selection signal of the multiplexer 1133, reads out setting information from the selected setting information register, and applies the setting information to the arithmetic device 1130. This implements an operation of changing the settings of an arithmetic process for each context ID.

Figure 9:
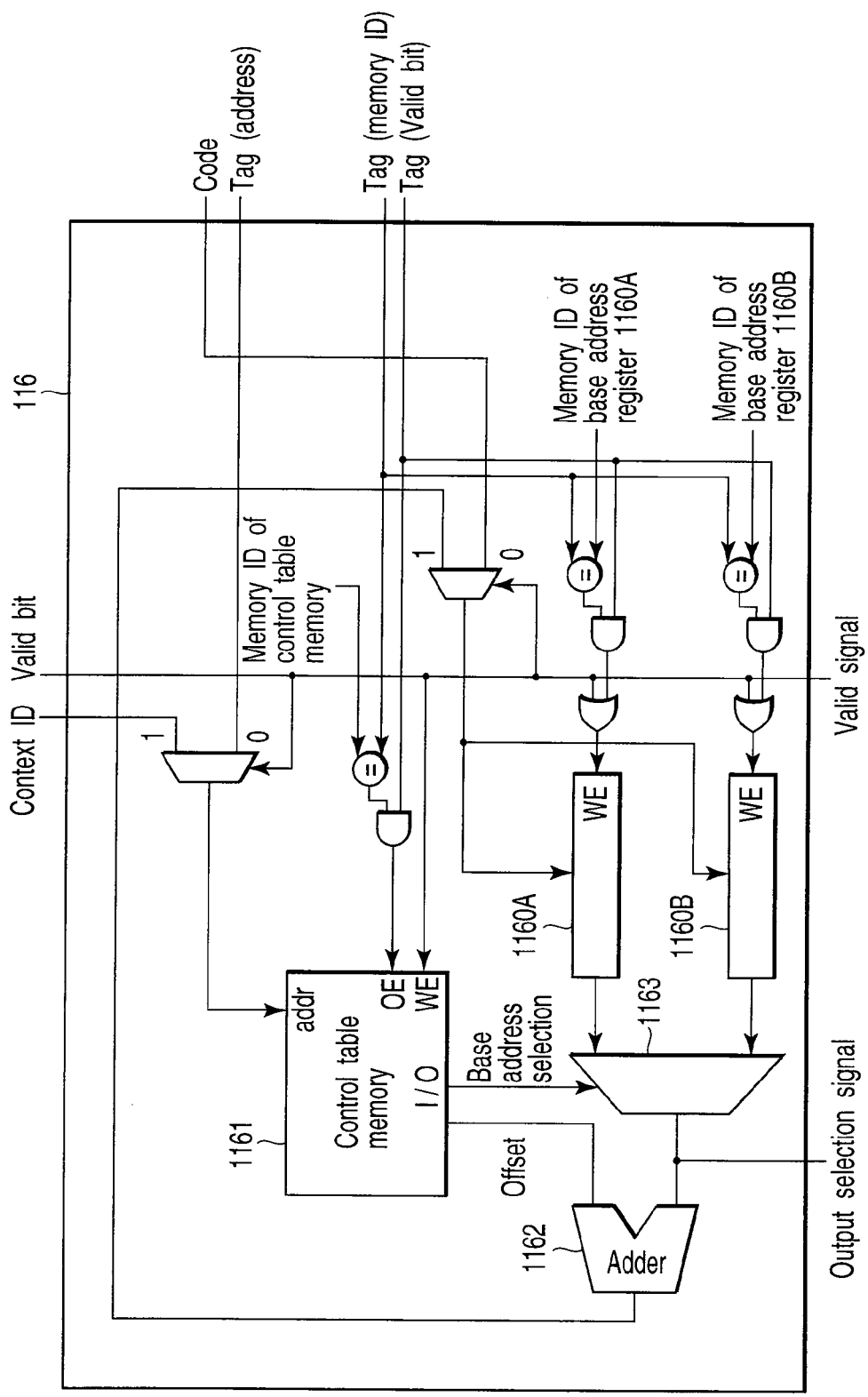
FIG. 9 is a circuit diagram showing an output controller.

FIG. 9 shows an implementation example of the output controller 116 in the arithmetic engine 11E. The output controller 116 in the arithmetic engine 11E includes base address registers 1160A and 1160B, a control table memory 1161, an adder 1162, and a multiplexer 1163.

The base address registers 1160A and 1160B store base addresses to be used in calculating an output address to the data memory 15. The number of base address registers 1160 is arbitrary and need only be 1 or more. The control table memory 1161 stores pairs of offsets and selection signal values to select one of the base address registers 1160A and 1160B. Initial setting of the base address registers 1160A and 1160B and control table memory 1161 is done in accordance with the same procedure as that of initialization of the setting information register 1132 of the arithmetic unit 113.

The output controller 116 in the arithmetic engine 11E refers to the control table memory 1161 by using a context ID transmitted from the input controller 110 as an address and an offset and selection signal value to select one of the base address registers 1160A and 1160B that store the base addresses to be used for address calculation. The readout selection signal value is used as the selection signal of the multiplexer 1163 so that one of the base address registers 1160A and 1160B is selected, and a base address stored therein is read out. The readout base address is externally output as an output selection signal and added to the offset by the adder 1162. The sum is written back in the selected base address register 1160. If 0 is input as a Valid bit, the base address register 1160 is not updated.

The output controller 116 in each of the arithmetic engines 11A to 11D is different from that in the arithmetic engine 11E, as shown in FIG. 10. The control table memory 1161 of the output controller 116 in each of the arithmetic engines 11A to 11D stores selection signal values to select one of the data registers 120A to 120H in the inter-arithmetic-engine buffer 12 to be used for output in correspondence with the number of context IDs to be used in a data process.

The output controller 116 in each of the arithmetic engines 11A to 11D reads out a selection signal value from the control table memory 1161 by using a context ID transmitted from the input controller 110 as an address and outputs the selection signal as an output selection signal.

Figure 11:
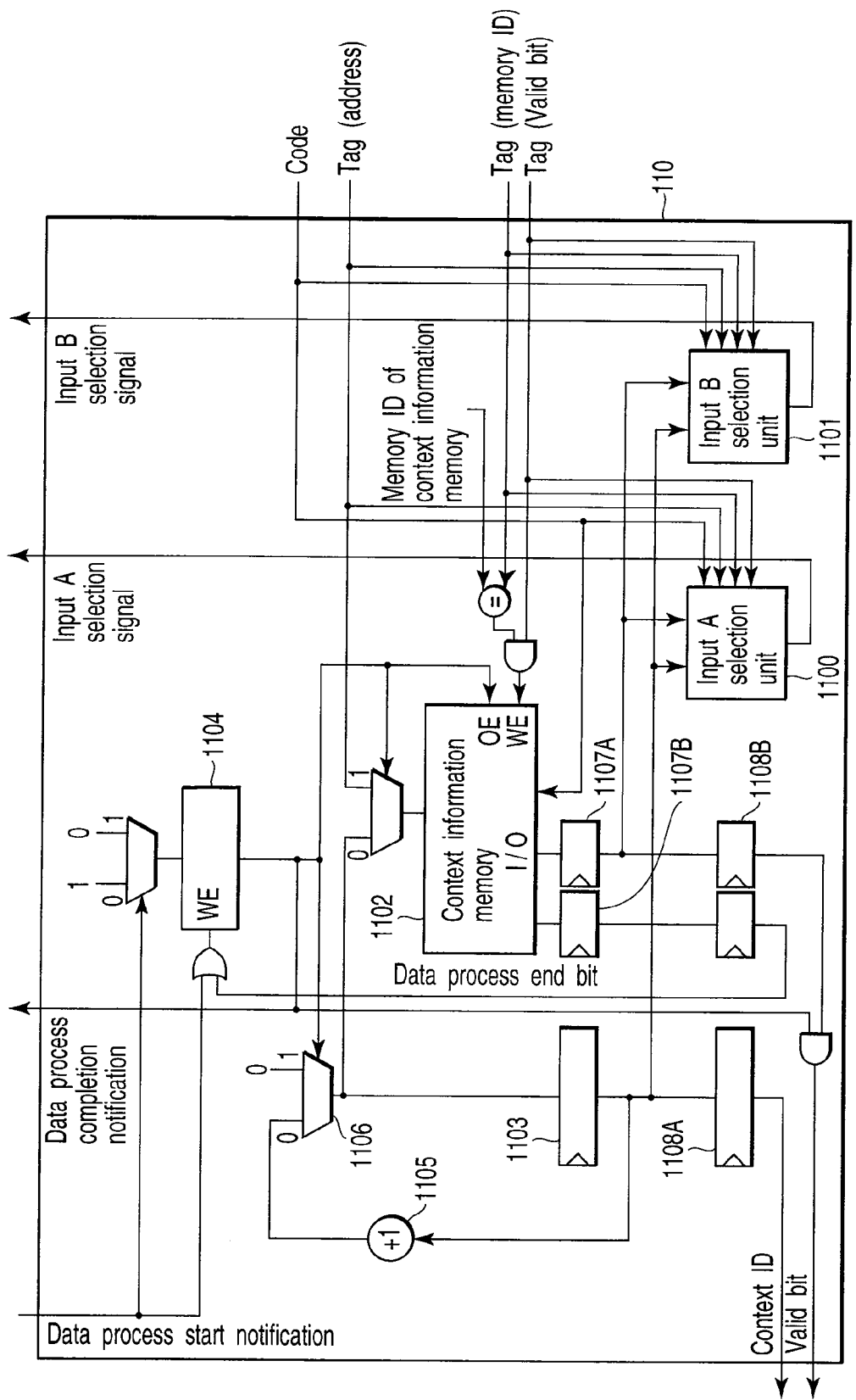
FIG. 11 is a circuit diagram showing an input controller.

FIG. 11 is a circuit diagram showing an implementation example of the input controller 110 in each of the arithmetic engines 11A to 11E. The input controller 110 includes an input A selection unit 1100, an input B selection unit 1101, a context information memory 1102, a context ID latch 1103, a data process end latch 1104, an incrementer 1105, a multiplexer 1106, latches 1107A and 1107B, and timing latches 1108A and 1108B.

The input A selection unit 1100 and input B selection unit 1101 are circuits to generate an input A selection signal and input B selection signal, respectively. In the input controller 110 of the arithmetic engine 11A, these circuits are the same as in the output controller 116 of the arithmetic engine 11E. In the input controllers 110 of the arithmetic engines 11B to 11E, these circuits are the same as in the output controllers 116 of the arithmetic engines 11A to 11E. The input A or B selection signal corresponds to the output selection signal of the output controller. No Valid signal is output.

The context information memory 1102 stores pieces of context information each containing a Valid bit and data process end bit in correspondence with the number of context IDs to be used in a data process.

The context ID latch 1103 stores the value of a context ID to be output. When a context ID is output, the incrementer 1105 increments the value of the context ID latch 1103 by one.

The data process end latch 1104 stores a signal representing whether a data process is ended. In the initial state of the semiconductor device 1, the value of this latch is 1, indicating the completion of a data process.

The operation of the input controller 110 will be described next.

When an external device such as a processor notifies the semiconductor device 1 of the start of a data process, the data process end latch 1104 is set to 0. In this cycle, the context ID latch 1103 indicates 0 so that context information stored at address 0 of the context information memory 1102 is read out. A Valid bit and data end bit contained in the readout context information are set in the latches 1107A and 1107B, respectively.

In the next cycle, the input A selection unit 1100 and input B selection unit 1101 output the input A selection signal and input B selection signal in accordance with the context ID stored in the context ID latch 1103 and the Valid bit stored in the latch 1107A. The context ID and Valid bit are output to the arithmetic unit 113A after timing adjustment is done by the timing latches 1108A and 1108B such that the timing of their arrival at the arithmetic unit 113A becomes equal to the timing when input A data and input B data read out by the input A selection signal and input B selection signal arrive at the arithmetic unit 113A. At the end of the cycle, the incrementer 1105 increments the value of the context ID latch 1103 by one. In a similar manner, a context ID and Valid bit are output in every cycle while 0 is read out as a process data end bit from the context information memory 1102.

When 1 is read out from the context information memory 1102 as a data process end bit, a context ID and Valid bit are output, and the data process end latch 1104 is set to 1.

From the next cycle, 1 is output as a data process completion signal. Since the data process end latch 1104 is set to 1, the Valid bit is 0. This indicates a state wherein the data process has finished in the arithmetic engine 11.

As described above, the arithmetic engines 11A to 11E output data and Valid signal at the same timing by pipeline transfer. The inter-arithmetic-engine buffer 12 writes, in the buffer (corresponding to the data register 120), only data received when the Valid signal is 1.

At this time, the input controller 110 is controlled by software in accordance with the code stored in the context information memory 1102 such that 0 is output as a Valid signal in a cycle during which it is possible to predict buffer nonavailability in the inter-arithmetic-engine buffer 12. This allows the semiconductor device 1 without a pipeline interlock mechanism to efficiently execute an arithmetic process even when the small number of arithmetic devices or the number of buffers in the inter-arithmetic-engine buffer 12 decreases.

An arrangement having a small number of buffers in the inter-arithmetic-engine buffer 12 can reduce the power consumed by the buffers for the operation of temporarily storing an arithmetic result as compared to a conventional semiconductor device using a dynamically reconfigurable circuit technology that uses no pipeline interlock. It is also possible to suppress an increase in the manufacturing cost.

In this embodiment, each of the arithmetic engines 11A to 11E has the multiplexer 118 and the final context ID latch 117 which stores the context ID output in the immediately preceding cycle. If the Valid bit output from the input controller 110 is 0, control is done to make the multiplexer 118 select the context ID stored in the final context ID latch 117 and output the context ID to the arithmetic unit 113 by pipeline transfer together with the Valid bit. When the Valid bit is 0, the output result from the arithmetic unit 113 is not written in the data pipeline register 114. For this reason, while the Valid bit is 0, the input and output signals and setting signal of the arithmetic unit 113 do not change from the states when the Valid bit was 1 last time.

It is therefore possible to reduce not only the power consumed by the inter-arithmetic-engine buffer 12 but also the power consumed by the arithmetic unit 113 and data pipeline register 114 in the arithmetic engine 11 as compared to a conventional dynamically reconfigurable circuit that uses no pipeline interlock.

The efficient arithmetic process and lower power consumption are achieved by controlling the input controller 110 by software, as described above. Codes for this control must be generated by, e.g., another semiconductor device in advance, stored in the code memory 13, and transferred to and stored in the context information memory 1102 by the code transfer control unit 14 in advance before the start of a data process. A compiler to generate the codes for the input controller 110 in advance will be described below.

The compiler can be implemented as, e.g., a computer program. The program has a storage unit which receives and stores a data dependence graph representing how to transfer/receive an arithmetic result between the arithmetic engines 11A to 11E, the number of steps of pipeline between the arithmetic engines 11A to 11E, and the number of cycles required for the read/write of the data memory. The program also has a code generation unit which generates codes to be stored in the context information memory 1102 of the input controller 110 and codes to be stored in the control table memory 1161 of each of the arithmetic engines 11A to 11D by referring to the information stored in the storage unit. The data of the data dependence graph is generated by, e.g., the user in advance.

As one of the characteristic features, the semiconductor device 1 of this embodiment can reduce the number of buffers in the inter-arithmetic-engine buffer 12 necessary for achieving a given performance. For this reason, the compiler must also be able to correctly generate codes even when the inter-arithmetic-engine buffer 12 includes a small number of buffers.

For this purpose, in the compiling method to be described below in detail, the execution order of a plurality of given arithmetic processes by the arithmetic engines 11A to 11E is determined in the following way. Priority is given to an arithmetic process for which input data to the arithmetic process is already partially calculated and written in the inter-arithmetic-engine buffer 12 over an arithmetic process for which no input data is generated for the arithmetic process. This minimizes the data retention time in the inter-arithmetic-engine buffer 12. This compiling method is different from a conventional compile method which assumes that the inter-arithmetic-engine buffer 12 has a lot of buffers.

The compiling method according to this embodiment will be described below in detail.

The compiler outputs codes to be stored in the context information memory 1102 of each of the arithmetic engines 11A to 11E and codes to be stored in the control table memory 1161 of each of the arithmetic engines 11A to 11D. To do this, the above-described code generation unit analyzes the data dependence graph representing the data dependence relationship between inputs and outputs for a plurality of arithmetic processes to be executed by the arithmetic engines 11A to 11E. As described above, the data dependence graph represents how to transfer/receive an arithmetic result between the arithmetic engines 11A to 11E.

The code generation unit includes a specifying unit, scheduling unit, determination unit, and generation unit. The specifying unit specifies, from the data dependence graph, an arithmetic process for which input data to the arithmetic process is already partially calculated and written in the inter-arithmetic-engine buffer 12. The scheduling unit determines the order of arithmetic processes to be executed by the arithmetic engines 11A to 11E while giving priority to the specified arithmetic process. The determination unit determines whether each of the arithmetic engines 11A to 11E should execute the arithmetic process in every cycle in accordance with the order. If each of the arithmetic engines 11A to 11E should execute the arithmetic process, the generation unit generates a code to cause a corresponding input controller 110 to output 1 as a Valid bit. If each arithmetic engine should not execute the arithmetic process, the generation unit generates a code to cause a corresponding input controller 110 to output 0 as a Valid bit. The code generation unit also generates codes to define the arithmetic process settings to be used by the arithmetic engines 11A to 11E in every cycle.

A more detailed process procedure of code generation complies with, e.g., a procedure shown in the flowchart of FIG. 12.

Figure 13:
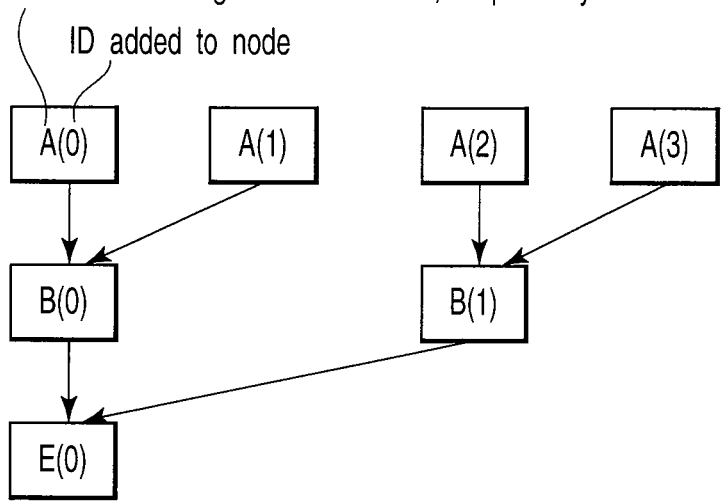
FIG. 13 is a view showing a data dependence graph.

FIG. 13 shows an example of the data dependence graph. A node of the data dependence graph corresponds to an arithmetic process executed by the arithmetic engine 11. An arrow of the data dependence graph indicates that the result of the arithmetic process corresponding to the node connected to the tail of the arrow is used as the input to the arithmetic process corresponding to the node connected to the head of the arrow. The data dependence graph of this example has the following restrictions. The upper limit number of nodes serving as inputs to an arbitrary node is 2. The output from an arbitrary node is always used as only the input to one node. Each node of the data dependence graph is given one of labels A to E to identify the arithmetic engines 11A to 11E to execute the arithmetic processes. The nodes of the respective labels are given IDs (e.g., numbers starting from 0).

A method of determining, on the basis of the data dependence graph in FIG. 13, the arithmetic process settings to be used by the arithmetic engines 11A to 11E in every cycle will be described with reference to the flowchart in FIG. 12.

For the descriptive convenience, assume that the latency of the arithmetic engines 11A to 11E is 1, and the inter-arithmetic-engine buffer 12 has only two data registers 120A and 120B. Note that this method is also applicable to an arrangement including three or more data registers. This method is also applicable to an arrangement in which the latency of the arithmetic engines 11A to 11E is 2 or more. The latency of the arithmetic engine 11 indicates the number of cycles necessary for the arithmetic engine 11 to finish an arithmetic process. For example, if the arithmetic engine 11 includes five arithmetic units 113, the latency is 5.

First, in step S0, an initialization process is executed. The processed node set is emptied, and the data dependence graph shown in FIG. 13 is set in a graph G. The use start times and usable times of the data registers 120A and 120B are set to 0. The usable times of the arithmetic engines 11A to 11E are set to L. L indicates the number of cycles required for the read/write of the data memory and is set to 1 in this example. In correspondence with each node N of the data dependence graph, another node N' which outputs an arithmetic result to the same destination as that of the node N is specified. The node N' is registered in the item of the node N in a node pair table. If no node N' exists, the item of the node N is empty. If the node N' exists, the expression "the nodes N and N' make a pair" is used. The spill node stack is emptied.

In step S1, it is checked whether a priority process node exists in the graph G. The priority process node indicates a node which is not included in the processed node set. In addition, the priority process node has two input nodes, only one of which is included in a processed node list. The priority process node corresponds to an arithmetic process for which the input data to the arithmetic process is already partially calculated, and the arithmetic result is written in the inter-arithmetic-engine buffer 12. As a characteristic feature of step S1, setting is done to preferentially process such an arithmetic process. At this point of time, the processed node set includes no nodes at all, and the process advances to step S2.

In step S2, it is checked whether a processible node exists in the graph G. A processible node indicates a node which is not included in the processed node set, and whose input nodes are all included in the processed node list, or the processible node has no input node. In this example, nodes A0 to A3 exist as processible nodes. The process advances to step S3.

In step S3, the deepest processible node N in the graph G is obtained. In this example, all the nodes A0 to A3 have the same depth. Hence, an arbitrary node is selected. For example, the node A0 is selected.

In step S4, it is determined whether the processible node N obtained in step S3 can be scheduled. "The processible node N can be scheduled" when it has no output, when at least one of the data registers 120 usable for result output of the processible node N is used for result output of a node which inputs to the node N, or when the usable time is not infinite. When the node N' paired with the node N exists, and the processed node set includes the node N', the data register 120 used for result output of the node N' is not usable for result output of the node N. At this point of time, the processed node set is empty. Hence, the node A0 can be scheduled. The process advances to step S5.

Figure 14:
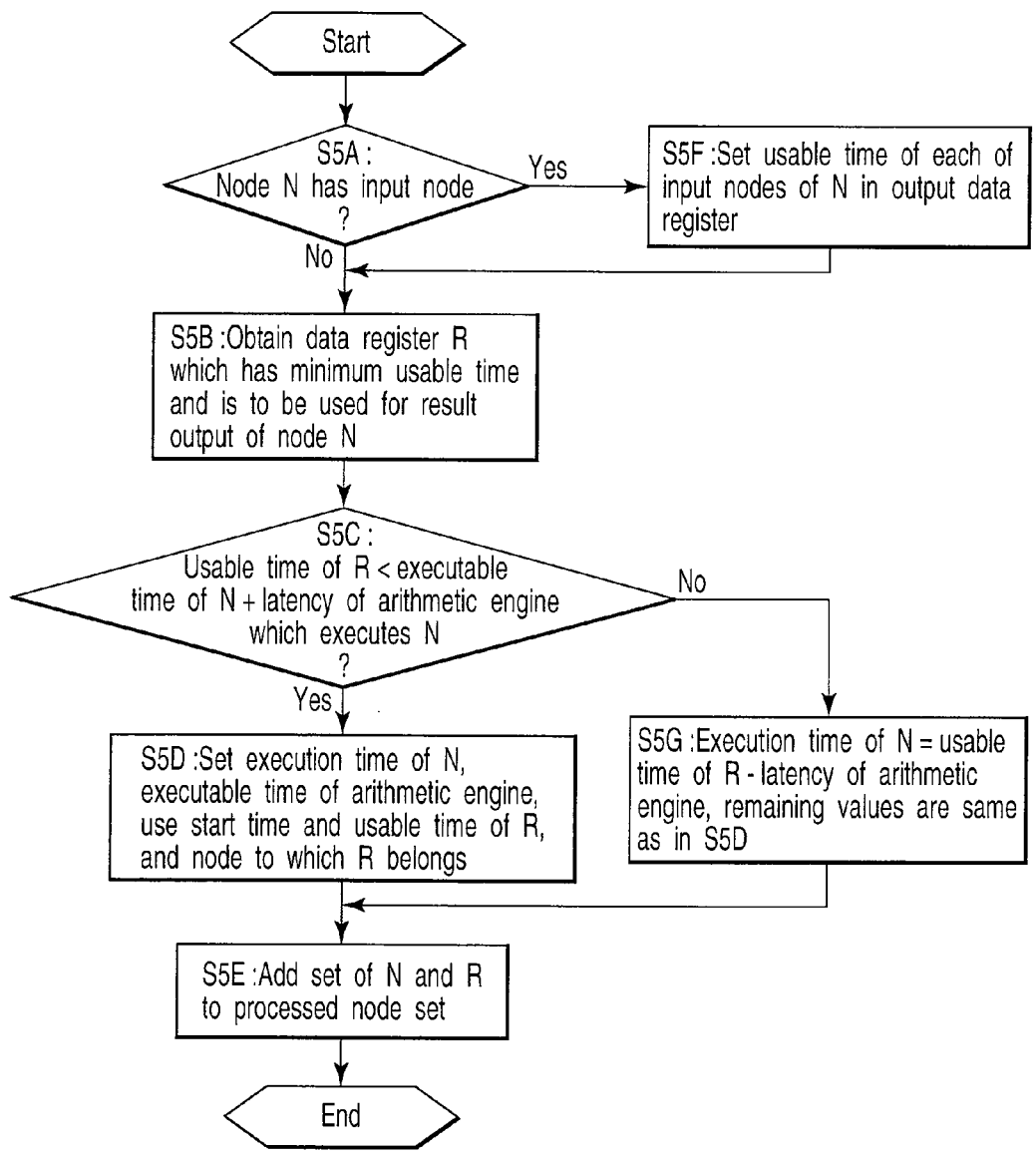
FIG. 14 is a flowchart illustrating the procedure of a node scheduling process.

In step S5, the node N is scheduled. The scheduling process in step S5 is executed in accordance with, e.g., a flowchart shown in FIG. 14.

First, in step S5A, it is checked whether a node serving as an input to the node N exists. In this example, the node A0 has no input node, and the process advances to step S5B.

In step S5B, a register R with a minimum usable time is selected from the data registers 120 usable for result output of the node N. If the node N has no output, the register R is selected arbitrarily. At this point of time, the usable times of the data registers 120A and 120B are 0 so that either can be used. In this example, the data register 120A is used.

In step S5C, a value obtained by adding the latency of the arithmetic engine 11 to the executable time of the node N is compared with the usable time of the register R. As the executable time of the node N, a later one of the usable time of the data register 120 used for result output of an arbitrary input node of the node N and the usable time of the arithmetic engine 11 is selected. If the node N has no input node, the executable time of the node N equals the usable time of the arithmetic engine 11. If the node N has no output, the process always advances to step S5D. In this example, since the usable time of the data register 120A is smaller, the process advances to step S5D.

In step S5D, the executable time of the node N obtained in step S5C is set to the execution time of the node N. The usable time of the node N is set by adding 1 to the execution time of the node N. The use start time of the register R is set by adding the latency of the arithmetic engine 11 to the execution time of the node N. The usable time of the register R is set to infinite. The node to which the register R belongs is set to N. If the node N has no output, the use start time and usable time of the register R are not updated. In this example, the execution time of the node A0 is 1. The usable time of the arithmetic engine 11A is 2. The use start time of the data register 120A is 2. The usable time of the data register 120A is infinite. The node to which the register R belongs is the node A0.

In step S5E, the set of the node N and the register R as the result output destination of the node N is added to the processed node set. In this example, the set of the node A0 and data register 120A is added to the processed node set.

When step S5 is ended, the process returns to step S1. The series of steps which are executed from the start of step S1 until the process returns to step S1 again will be referred to as an iteration.

In the next iteration I1, a priority process node B0 is detected in step S1. Hence, the process advances from step S1 to step S6.

In step S6, the graph G is stacked on the top of the graph stack. Next, a maximum concatenated partial graph G' of the graph G is obtained. The maximum concatenated partial graph G' includes the input node N', which is one of the input nodes of the priority process node obtained in step S1 and is not included in the processed node set, and does not include the priority process node. G' is called a priority process graph. The priority process graph G' is set in the graph G. In this example, the priority process graph G' includes only the node A1. The process returns from step S6 to step S1 and advances to iteration I2. In this example, in iteration I2, the process advances from step S1 to steps S2 and S3, and the node A1 is obtained as the deepest processible node.

In step S4, since the node A0 paired with the node A1 uses the data register 120A for result output, only the data register 120B is usable for result output of the node A1. Since the usable time of the data register 120B is 0, the node A1 can be scheduled. The process advances to step S5. In step S5, the process advances from step S5A to steps S5B, S5C, S5D, and S5E, like the node A0. The execution time of the node A1 is 2. The usable time of the arithmetic engine 11A is 3. The use start time of the data register 120B is 3. The usable time of the data register 120B is infinite. The node to which the data register 120B belongs is the node A1. The set of the node A1 and data register 120B is added to the processed node set. The process advances to iteration I3.

In iteration I3, the process advances from step S1 to step S2. Since the graph G no longer includes a processible node, the process advances to step S7.

In step S7, it is checked whether the graph stack is empty. If the graph stack is not empty, the process advances to step S8 to extract a graph from the top of the graph stack and set it in the graph G. In this example, since a graph is stacked on the graph stack in iteration I1, the process advances to step S8 to extract a graph from the graph stack and set it in the graph G. The graph G at this time is the same as that shown in FIG. 13.

In step S10, it is checked whether the spill node stack is empty. If the spill node stack is not empty, and a node present in the graph G is stacked on the top of the spill node stack, register reload is necessary. Since the spill node stack is empty at this point of time, the process advances to iteration I4.

In iteration I4, the process advances from step S1 to steps S2 and S3, and the node B0 is obtained as the deepest processible node. Both of the data registers 120A and 120B are usable for result output of the node B0. Since these data registers are used for result output of the nodes A0 and A1 as the inputs to the node B0, the node B0 can be scheduled.

In step S5, since the node B0 has an input node, the process advances from step S5A to step S5F. In step S5F, the data register 120 used for result output of each input node of the deepest processible node N obtained in step S3, and the use start time of the data register are obtained. A value obtained by adding 1 to the maximum value of the obtained use start time is set as the usable times of all obtained data registers. In this example, the usable times of the data registers 120A and 120B are both 4.

In step S5B, either of the data registers 120A and 120B can be selected because they have the same usable time. Assume that the data register 120A is selected. The process advances from step S5C to steps S5D and S5E. The execution time of the node B0 is 4. The usable time of the arithmetic engine 11B is 5. The use start time of the data register 120A is 5. The usable time of the data register 120A is infinite. The node to which the data register 120A belongs is the node B0. The set of the node B0 and the data register 120A is added to the processed nod set. The process then advances to iteration I5.

In iteration I5, a node E0 is obtained as a priority process node in step S1. Step S6 is executed, and the process advances to iteration I6.

In iteration I6, the process advances from step S1 to steps S2, S3, and S4. In step S5, a node A2 is scheduled. In step S5, the process advances from step S5A to step S5B. In step S5C, since the usable time of the data register 120B is equal to or more than (executable time of node A2+1), the process advances to step S5G.

In step S5G, a value obtained by subtracting the latency of the arithmetic engine 11 which executes the node N from the usable time of the register R obtained in step S5C is set to the execution time of the node N. The remaining values are obtained in the same way as in step S5D. In this example, the execution time of the node A2 is 3. The usable time of the arithmetic engine 11A is 4. The use start time of the data register 120B is 4. The usable time of the data register 120B is infinite. The node to which the data register 120B belongs is the node A2. The process advances to iteration I7.

In iteration I7, the process advances from step S1 to step S6. The graph G includes only a node A3.

In iteration I8, the process advances from step S1 to steps S2 and S3. In step S4, since both the data registers 120A and 120B have an infinite usable time, the node A3 cannot be scheduled. The process advances to step S9.

Figure 15:
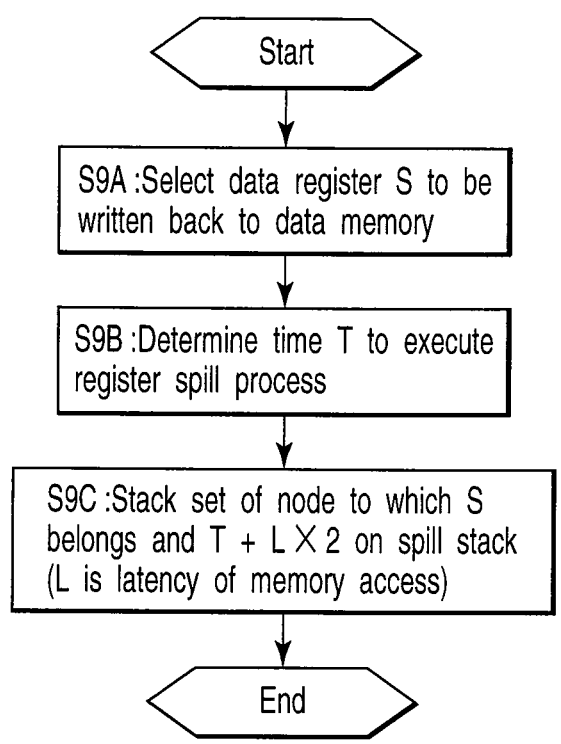
FIG. 15 is a flowchart illustrating the procedure of a spill process.

FIG. 15 is a flowchart illustrating the procedure of a spill process in step S9. First, in step S9A, a data register to be written back to the data memory 15 is selected from the data registers 120A and 120B. This write back process is called a register spill process. If the node N' paired with the node N that cannot be scheduled exists, the data register 120 that is not used for result output of the node N' is selected. If the node N' paired with the node N does not exist, an arbitrary data register 120 is selected. In this example, the data register 120A is selected.

In step S9B, the time to cause the arithmetic engine 11E to execute the register spill process is determined. The usable time of the arithmetic engine 11E is compared with a time obtained by adding 1 to the use start time of the data register 120 to be written back to the data memory. The larger time is obtained as the time to execute the register spill process. Additionally, the execution time of a new node (data saving node) which is added to the graph to represent data saving executed by the arithmetic engine 11E and the usable time of the data register 120 are set to the time to execute the register spill process. In this example, the time to execute the register spill process is time 6. The execution time of a data saving node E1 and the usable time of the data register 120A are set to 6.

In step S9C, the set of the node to which the data register 120 belongs and a time obtained by adding 2×L to the time to execute the register spill process is stacked on the spill stack. In this example, the set of the node B0 and time 8 is stacked on the spill stack. The process advances to step S5.

In step S5, since the use start time of the data register 120A is updated to 6, the execution time of the node A3 is 5. The usable time of the arithmetic engine 11A is 6. The use start time of the data register 120A is 6. The usable time of the data register 120A is infinite. The node to which the data register 120A belongs is the node A3. The process advances to iteration I9.

In iteration I9, the process advances from step S1 to steps S2, S7, and S8. In step S10, although the spill stack is not empty, the graph G extracted from the graph stack in step S8 does not include the node B0 on the top of the spill stack. Hence, the process advances to iteration I10.

In iteration I10, the process advances from step S1 to steps S2, S3, S4, and S5. The execution time of a node B1 is 7. The usable time of the arithmetic engine 11B is 8. The use start time of the data register 120B is 8. The usable time of the data register 120B is infinite. The node to which the data register 120B belongs is the node B1. The process advances to iteration I11.

In iteration I11, the process advances from step S1 to steps S2, S7, and S8. In step S10, it is determined that register reload is necessary. The process advances to step S11.

Figure 16:
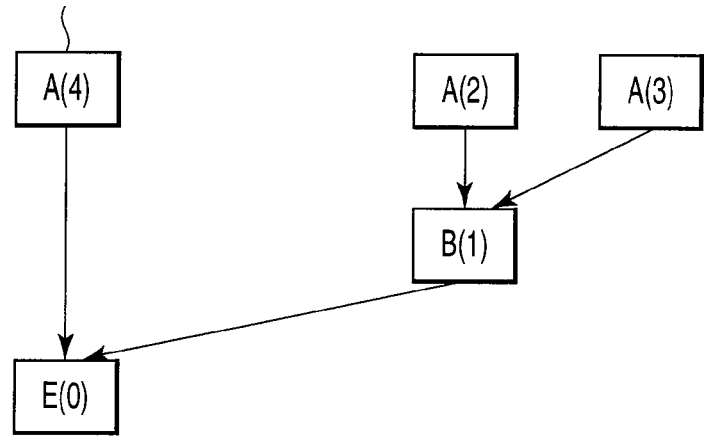
FIG. 16 is a view showing a data dependence graph after node replacement.

In step S11, first, a set of a node and time is extracted from the top of the spill stack. The usable time of the arithmetic engine 11A is set to the extraction time. Next, the maximum concatenated partial graph (i.e., priority process graph) G' including the extracted node but not the output of the node is obtained from the graph G. The priority process graph G' is replaced with a node of the arithmetic engine 11A for data return. In this example, the usable time of the arithmetic engine 11A is 8. The data dependence graph is updated as shown in FIG. 16. The process advances to iteration I12.

In iteration I12, the process advances from step S1 to steps S2, S3, S4, and S5. A node A4 for data return generated in iteration I1 is scheduled. The execution time of the node A4 is 8. The usable time of the arithmetic engine 11A is 9. The use start time of the data register 120A is 9. The usable time of the data register 120A is infinite. The node to which the data register 120A belongs is the node A4. The process advances to iteration I13.

In iteration I13, the process advances from step S1 to steps S2, S3, S4, and S5. The execution time of the node E0 is 10. The usable time of the arithmetic engine 11E is 11.

In next iteration I14, the process advances from step S1 to steps S2 and S7. Since the graph stack is empty, the process advances to step S12 to finally output a code.

Figure 17:
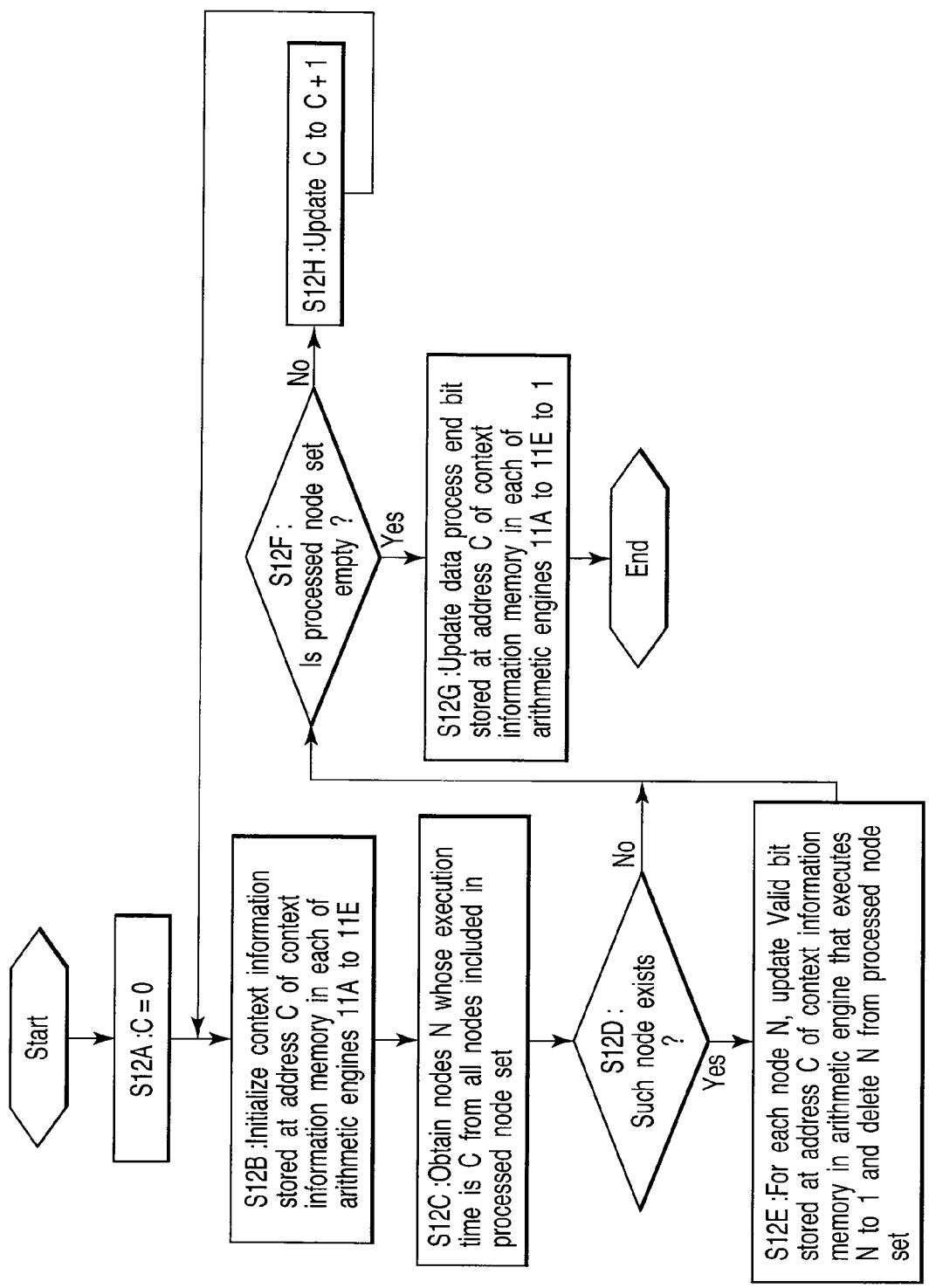
FIG. 17 is a flowchart illustrating the procedure of a code output process.

FIG. 17 is a flowchart illustrating the procedure of a code output process in step S12. First, in step S12A, a variable C indicating an address is initialized to 0.

In step S12B, context information stored at the address C of the context information memory 1102 in each of the arithmetic engines 11A to 11E is initialized. With this initialization, the Valid bit and data process end bit are initialized to 0.

In step S12C, nodes whose execution time is C are obtained from all nodes N included in the processed node set. If such a node exists, the process advances to step S12E. If no node exists at all, the process advances to step S12F.

In step S12E, for each node N detected in step S12C, the Valid bit stored at the address C of the context information memory 1102 in the arithmetic engine 11 that executes the node N is updated to 1. If the node N has an output, a value representing the register R is stored at the address C of the control table memory 1161 of the arithmetic engine 11 that executes the node N as a selection signal value to select one of the data registers 120A to 120H of the iteration I12. In addition, all nodes N detected in step S12C are deleted from the processed node set.

In step S12F, it is determined whether the processed node set is empty. If the processed node set is not empty, the process advances to step S12H to update the address C to C+1. Then, the process returns to step S12B. If the processed node set is empty, the process advances to step S12G.

In step S12G, the data process end bit stored at the address C of the context information memory 1102 of the input controller 110 in each of the arithmetic engines 11A to 11E is set to 1, and code generation is ended.

Figure 18:
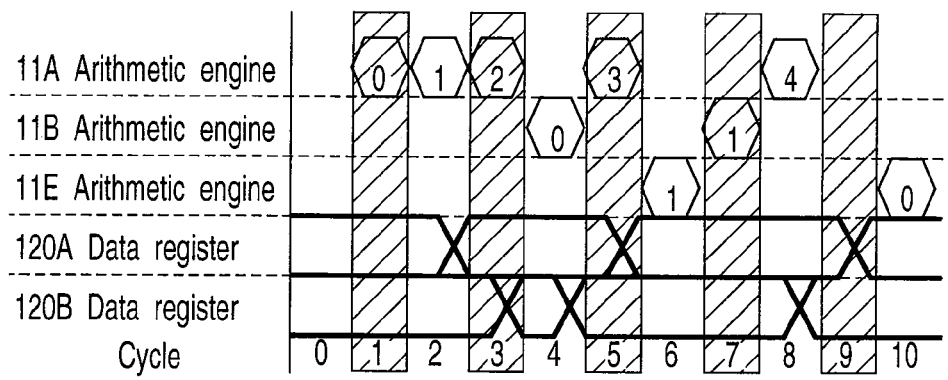
FIG. 18 is a timing chart of a semiconductor device which is operated in accordance with a code generated from the data dependence graph.

FIG. 18 is a timing chart of the semiconductor device 1 which is executed in accordance with a code generated from the data dependence graph in FIG. 13 by the above-described compile method. Referring to FIG. 18, each cycle in which the arithmetic result of each arithmetic engine 11 is output together with the Valid bit "1" has a label corresponding to the arithmetic process (FIG. 13). FIG. 18 also shows in which cycle the value of each data register 120 changes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising:
a first arithmetic engine which executes a first arithmetic process in every cycle and outputs first data, via a first data pipeline, representing a result of the first arithmetic process and a first valid signal, via a first control pipeline, representing one of a first value and a second value in every cycle, wherein the first arithmetic engine comprises a first input controller having a first internal storage unit and a first output controller, wherein the first internal storage unit stores a first software code to determine the value of the first valid signal and the first input controller determines the value of the first valid signal according to the first software code and outputs, via the first control pipeline, the first valid signal in every cycle to the first output controller;
a second arithmetic engine which executes a second arithmetic process in every cycle and outputs second data, via a second data pipeline, representing a result of the second arithmetic process and a second valid signal, via a second control pipeline, representing one of the first value and the second value in every cycle, wherein the second arithmetic engine comprises a second input controller having a second internal storage unit and a second output controller, wherein the second internal storage unit stores a second software code to determine the value of the second valid signal and the second input controller determines the value of the second valid signal according to the second software code and outputs, via the second control pipeline, the second valid signal in every cycle to the second output controller; and
an inter-arithmetic-engine buffer in communication with the first and second data pipelines to exchange the first data and the second data between the first arithmetic engine and the second arithmetic engine, wherein the inter-arithmetic-engine buffer enables write of the first data from the first arithmetic engine if the first valid signal indicates the first value and the second valid signal indicates the second value, wherein the inter-arithmetic-engine buffer enables write of the second data from the second arithmetic engine if the first valid signal indicates the second value and the second valid signal indicates the first value, and wherein the inter-arithmetic-engine buffer inhibits write of both the first data from the first arithmetic engine and the second data from the second arithmetic engine if both the first valid signal and the second valid signal indicate the second value,
wherein the first software code includes information indicating a storage location that is located on the inter-arithmetic-engine buffer and stores data used for the first arithmetic process, and information indicating a storage location that is located on the inter-arithmetic-engine buffer and stores the first data, and
wherein the second software code includes information indicating a storage location that is located on the inter-arithmetic-engine buffer and stores data used for the second arithmetic process, and information indicating a storage location that is located on the inter-arithmetic-engine buffer and stores the second data.

2. The device according to claim 1, wherein
the first arithmetic engine comprises:
a first setting information register which stores first setting information identifiable by a first setting ID; and
a first arithmetic unit which reads out the first setting information from the first setting information register in accordance with the first setting ID in every cycle and executes the first arithmetic process while changing setting in accordance with the first setting information, and
the second arithmetic engine comprises:
a second setting information register which stores second setting information identifiable by a second setting ID; and
a second arithmetic unit which reads out the second setting information from the second setting information register in accordance with the second setting ID in every cycle and executes the second arithmetic process while changing setting in accordance with the second setting information.

3. The device according to claim 2, further comprising:
a first control circuit which controls not to change the first setting information and the first data if the valid signal indicates the second value; and
a second control circuit which controls not to change the second setting information and the second data if the valid signal indicates the second value.

4. A compiler which generates the first software code and the second software code to be used in a semiconductor device of claim 1, comprising:
a determination unit which determines, on the basis of a data dependence graph representing a dependence relationship between the first data and the second data exchanged between the first arithmetic engine and the second arithmetic engine, whether each of the first arithmetic engine and the second arithmetic engine should execute an arithmetic process in every cycle; and
a code generation unit which generates, as the first software code, a software code to make the first controller output the first value if the first arithmetic engine should execute an arithmetic process and make the first controller output the second value if the first arithmetic engine should execute no arithmetic process, and
generates, as the second software code, a software code to make the second controller output the first value if the second arithmetic engine should execute an arithmetic process and make the second controller output the second value if the second arithmetic engine should execute no arithmetic process.

5. The compiler according to claim 4, wherein the determination unit comprises:
a specifying unit which specifies, from the data dependence graph, an arithmetic process for which input data to the arithmetic process is already partially calculated and written in the inter-arithmetic-engine buffer; and
a scheduling unit which determines an order of arithmetic processes to be executed by the first arithmetic engine and the second arithmetic engine so as to preferentially execute the arithmetic process specified by the specifying unit.

6. A code generation method of generating the first software code and the second software code to be used in a semiconductor device of claim 1, comprising:
causing a determination unit to determine, on the basis of a data dependence graph representing a dependence relationship between the first data and the second data exchanged between the first arithmetic engine and the second arithmetic engine, whether each of the first arithmetic engine and the second arithmetic engine should execute an arithmetic process in every cycle; and
causing a code generation unit to generate, as the first software code, a code to make the first controller output the first value if the first arithmetic engine should execute an arithmetic process and make the first controller output the second value if the first arithmetic engine should execute no arithmetic process, and generate, as the second software code, a code to make the second controller output the first value if the second arithmetic engine should execute an arithmetic process and make the second controller output the second value if the second arithmetic engine should execute no arithmetic process.

7. A computer readable storage medium storing instructions of a computer program for generating the first software code and the second software code to be used in a semiconductor device of claim 1, which when executed by a computer results in performance of steps comprising:
determining, on the basis of a data dependence graph representing a dependence relationship between the first data and the second data exchanged between the first arithmetic engine and the second arithmetic engine, whether each of the first arithmetic engine and the second arithmetic engine should execute an arithmetic process in every cycle; and
generating, as the first software code, a code to make the first controller output the first value if the first arithmetic engine should execute an arithmetic process and make the first controller output the second value if the first arithmetic engine should execute no arithmetic process, and generating, as the second software code, a code to make the second controller output the first value if the second arithmetic engine should execute an arithmetic process and make the second controller output the second value if the second arithmetic engine should execute no arithmetic process.

8. The device according to claim 1, where the first and second arithmetic engines each comprise a plurality of arithmetic units and a plurality of control pipeline registers associated with the arithmetic units and configured to control operations of the arithmetic units, and wherein the first and second valid signals are sequentially transferred on the control pipeline registers in every cycle.

9. A semiconductor device comprising:
an input controller which outputs a valid bit to a control pipeline, having one of a first value and a second value in every cycle of a plurality of cycles including a first cycle and a second cycle;
a first control register in communication with the control pipeline which stores the valid bit and outputs the valid bit to the control pipeline in the first cycle;
a first arithmetic unit which executes an arithmetic process of first data and outputs second data to a data pipeline;
a first data register in communication with the data pipeline which stores the second data and outputs the second data to the data pipeline in the first cycle;
a second control register in communication with the control pipeline which stores the valid bit output from the first control register and outputs the valid bit to the control pipeline in the second cycle;
a second arithmetic unit which executes an arithmetic process of the second data output from the first data register and outputs third data to the data pipeline;
a second data register in communication with the data pipeline which stores the third data and outputs the third data to the data pipeline in the second cycle;
a storage unit which stores a code to determine the value of the valid bit;
an output controller which obtains the value of the valid bit from the code and outputs the valid bit to the control pipeline in every cycle; and
an inter-arithmetic-engine buffer which enables write of the third data output from the second data register via the data pipeline if the valid bit output from the second control register indicates the first value, and inhibits write of the third data output from the second data register via the data pipeline if the valid bit output from the second control register indicates the second value,
wherein the code includes information indicating a storage location that is located on the inter-arithmetic-engine buffer and stores data used for the arithmetic process of the first arithmetic unit, and information indicating a storage location that is located on the inter-arithmetic-engine buffer and stores the first data, and wherein the code includes information indicating a storage location that is located on the inter-arithmetic-engine buffer and stores data used for the arithmetic process of the second arithmetic unit, and information indicating a storage location that is located on the inter-arithmetic-engine buffer and stores the second data.

10. The device according to claim 9, wherein
the first arithmetic unit comprises a first setting information register which stores first setting information identifiable by a first setting ID and reads out the first setting information from the first setting information register in accordance with the first setting ID in every cycle and executes an arithmetic process while changing setting in accordance with the first setting information, and
the second arithmetic unit comprises a second setting information register which stores second setting information identifiable by a second setting ID and reads out the second setting information from the second setting information register in accordance with the second setting ID in every cycle and executes an arithmetic process while changing setting in accordance with the second setting information.

11. The device according to claim 10, further comprising:
a first control circuit which controls not to change the first setting information and the second data if the valid bit indicates the second value; and
a second control circuit which controls not to change the second setting information and the third data if the valid bit indicates the second value.

12. The device according to claim 9, wherein
the first arithmetic unit comprises a first setting information register which stores first setting information identifiable by a first setting ID and reads out the first setting information from the first setting information register in accordance with the first setting ID in every cycle and executes an arithmetic process while changing setting in accordance with the first setting information, and
the second arithmetic unit comprises a second setting information register which stores second setting information identifiable by a second setting ID and reads out the second setting information from the second setting information register in accordance with the second setting ID in every cycle and executes an arithmetic process while changing setting in accordance with the second setting information.

13. The device according to claim 12, further comprising:
a first control circuit which controls not to change the first setting information and the first data if the valid bit indicates the second value; and
a second control circuit which controls not to change the second setting information and the second data if the valid bit indicates the second value.

14. A reconfigurable device comprising:
a first setting information register which stores first setting information identifiable by a first setting ID;
a first arithmetic engine which reads out the first setting information from the first setting information register in accordance with the first setting ID in every cycle, executes a first arithmetic process while changing setting in accordance with the first setting information, and outputs, via a first data pipeline, first data representing a result of the first arithmetic process and a first valid signal, via a first control pipeline, representing one of a first value and a second value in every cycle, wherein the first arithmetic engine comprises a first input controller having a first internal storage unit and a first output controller, wherein the first internal storage unit stores a first software code to determine the value of the first valid signal and the first input controller determines the value of the first valid signal according to the first software code and outputs, via the first control pipeline, the first valid signal in every cycle to the first output controller;
a second setting information register which stores second setting information identifiable by a second setting ID;
a second arithmetic engine which reads out the second setting information from the second setting information register in accordance with the second setting ID in every cycle, executes a second arithmetic process while changing setting in accordance with the second setting information, and outputs, via a second data pipeline, second data representing a result of the second arithmetic process and a second valid signal, via a second control pipeline, representing one of the first value and the second value in every cycle, wherein the second arithmetic engine comprises a second input controller having a second internal storage unit and a second output controller, wherein the second internal storage unit stores a second software code to determine the value of the second valid signal and the second input controller determines the value of the second valid signal according to the second software code and outputs, via the second control pipeline, the second valid signal in every cycle to the second output controller; and
an inter-arithmetic-engine buffer in communication with the first and second data pipelines to exchange the first data and the second data between the first arithmetic engine and the second arithmetic engine, wherein the inter-arithmetic-engine buffer enables write of the first data from the first arithmetic engine if the first valid signal indicates the first value and the second valid signal indicates the second value, wherein the inter-arithmetic-engine buffer enables write of the second data from the second arithmetic engine if the first valid signal indicates the second value and the second valid signal indicates the first value, and wherein the inter-arithmetic-engine buffer inhibits write of both the first data from the first arithmetic engine and the second data from the second arithmetic engine if both the first valid signal and the second valid signal indicate the second value, wherein the first software code includes information indicating a storage location that is located on the inter-arithmetic-engine buffer and stores data used for the first arithmetic process, and information indicating a storage location that is located on the inter-arithmetic-engine buffer and stores the first data, and wherein the second software code includes information indicating a storage location that is located on the inter-arithmetic-engine buffer and stores data used for the second arithmetic process, and information indicating a storage location that is located on the inter-arithmetic-engine buffer and stores the second data.

15. The device according to claim 14, wherein
the first arithmetic engine comprises:
a first setting information register which stores first setting information identifiable by a first setting ID; and
a first arithmetic unit which reads out the first setting information from the first setting information register in accordance with the first setting ID in every cycle and executes the first arithmetic process while changing setting in accordance with the first setting information, and
the second arithmetic engine comprises:
a second setting information register which stores second setting information identifiable by a second setting ID; and
a second arithmetic unit which reads out the second setting information from the second setting information register in accordance with the second setting ID in every cycle and executes the second arithmetic process while changing setting in accordance with the second setting information.

16. The device according to claim 15, further comprising:
a first control circuit which controls not to change the first setting information and the first data if the first valid signal indicates the second value; and
a second control circuit which controls not to change the second setting information and the second data if the second valid signal indicates the second value.

17. A compiler which generates the first software code and the second software code to be used in a reconfigurable device of claim 14, comprising:
a determination unit which determines, on the basis of a data dependence graph representing a dependence relationship between the first data and the second data exchanged between the first arithmetic engine and the second arithmetic engine, whether each of the first arithmetic engine and the second arithmetic engine should execute an arithmetic process in every cycle; and
a code generation unit which generates, as the first software code, a code to make the first controller output the first value if the first arithmetic engine should execute an arithmetic process and make the first controller output the second value if the first arithmetic engine should execute no arithmetic process, and
generates, as the second software code, a code to make the second controller output the first value if the second arithmetic engine should execute an arithmetic process and make the second controller output the second value if the second arithmetic engine should execute no arithmetic process.

18. The compiler according to claim 17, wherein the determination unit comprises:
a specifying unit which specifies, from the data dependence graph, an arithmetic process for which input data to the arithmetic process is already partially calculated and written in the inter-arithmetic-engine buffer; and
a scheduling unit which determines an order of arithmetic processes to be executed by the first arithmetic engine and the second arithmetic engine so as to preferentially execute the arithmetic process specified by the specifying unit.

* * * * *